US012754909B2

(12) United States Patent
Hilgart et al.

(10) Patent No.: US 12,754,909 B2
(45) Date of Patent: Oct. 6, 2026

(54) QUERY GENERATION BASED ON NATURAL LANGUAGE QUESTION AND SEMANTIC DATA

(71) Applicant: Snowflake Inc., Bozeman, MT (US)

(72) Inventors: Jonathan James Hilgart, Alameda, CA (US); Mengyu Huang, San Mateo, CA (US); Nicole Limtiaco, San Francisco, CA (US); Yusuf Ozuysal, Palo Alto, CA (US); Nipun Sehrawat, San Jose, CA (US); Daniel Gustavo Schlindwein Silva, San Francisco, CA (US); Pieter Joris Verhoeven, San Francisco, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 19/038,873

(22) Filed: Jan. 28, 2025

(65) Prior Publication Data

US 2025/0335435 A1 Oct. 30, 2025

Related U.S. Application Data

(60) Provisional application No. 63/640,762, filed on Apr. 30, 2024.

(51) Int. Cl.
*G06F 16/2452* (2019.01)
*G06F 16/25* (2019.01)

(52) U.S. Cl.
CPC ...... *G06F 16/24522* (2019.01); *G06F 16/252* (2019.01)

(58) Field of Classification Search
CPC ............. G06F 16/24522; G06F 16/252; G06F 16/3329
See application file for complete search history.

(56) References Cited

U.S. PATENT DOCUMENTS

| | | | | |
|---|---|---|---|---|
| 6,282,537 | B1 | 8/2001 | Madnick et al. | |
| 2023/0099901 | A1* | 3/2023 | Li | G06F 40/205 707/803 |
| 2024/0346021 | A1* | 10/2024 | Xuan | G06F 40/20 |

(Continued)

OTHER PUBLICATIONS

Wang, MAC-SQL: A Multi-Agent Collaborative Framework for Text-to-SQL, pp. 1-16, Feb. 15, 2024.*

(Continued)

*Primary Examiner* — Albert M Phillips, III

(74) *Attorney, Agent, or Firm* — Schwegman Lundberg & Woessner, P.A.

(57) ABSTRACT

Various embodiments described herein provide for systems, methods, devices, instructions, and like for generating a structured language data query based on a natural language question and semantic data associated with a schema of a data store (e.g., database or the like). In particular, some embodiments use a set of large language models to generate a structured language data query for a data store based on semantic data and the natural language question, determines whether the structured language data query is valid, causes the structured language data query to be performed on a data store in response to determining that the structured language data query is valid, and generating a response that comprises a query result from the data store.

20 Claims, 8 Drawing Sheets

(56) References Cited

U.S. PATENT DOCUMENTS

2025/0086186 A1 3/2025 Srinivasan et al.

OTHER PUBLICATIONS

Ren, Purple: Making a Large Language Model a Better SQL Writer, pp. 1-14, Mar. 29, 2024.*
Panda, Build Robust text-to-SQL Solution Generating Complex Queries, Self-Correcting, and Querying Diverse Data Sources, pp. 1-22, Mar. 5, 2024.*
"Streamlit", [Online]. Retrieved from the Internet: https: pypi.org project streamlit , (Aug. 2025), 7 pgs.
"Your AI Analyst delivering business-ready insights", [Online]. Retrieved from the Internet: http: chrisandkarah.com ai-analyst.html, (2024), 3 pgs.
"Introducing GPTs | OpenAI", [Online]. Retrieved from the Internet: https: openai.com index introducing-gpts , (Nov. 2023), 8 pgs.
"Assistants API overview—OpenAI API", [Online]. Retrieved from the Internet: https: www.pype.dev thoughts-477 , (Dec. 2024), 2 pgs.
"Customize Copilot and Create Agents", [Online]. Retrieved from the Internet: https: www.microsoft.com en-us microsoft-365-copilot microsoft-copilot-studio, (2025), 10 pgs.
"Welcome to the Data Intelligence Platform: Databricks + Einblick", [Online]. Retrieved from the Internet: https: www.databricks.com blog welcome-data-intelligence-platform-databricks-einblick, (Jan. 2024), 7 pgs.
"Overview of Copilot for Power BI—Power BI", [Online]. Retrieved from the Internet: https: learn.microsoft.com en-us power-bi create-reports copilot-introduction, (Aug. 2025), 8 pgs.
"Whats new for Looker and business intelligence at Next 2023", [Online]. Retrieved from the Internet: https: cloud.google.com blog products business-intelligence whats-new-for-looker-and-business-intelligence-at-next-2, (Aug. 2023), 9 pgs.
Atscale, "A Semantic Layer for Optimized Cloud Costs and Performance", [Online]. Retrieved from the Internet: https: www.atscale.com , (Accessed online Aug. 7, 2025), 7 pages.
DBT Labs, "dbt Semantic Layer", [Online]. Retrieved from the Internet: https: docs.getdbt.com docs use-dbt-semantic-layer dbt-sl, (Accessed online Aug. 7, 2025), 4 pages.
Deptalla, Sebastian, "Tableau Relationships Basics the Ground Rules", [Online]. Retrieved from the Internet: https: interworks.com blog 2022 08 04 tableau-relationships-basics-the-ground-rules , (Aug. 4, 2022), 12 pages.
Google Cloud Community, "The problem of SQL fanouts", [Online]. Retrieved from the Internet: https: discuss.google.dev t the-problem-of-sql-fanouts 119220, (Jun. 2022), 11 pages.
Google Cloud Looker, "symmetric aggregates", [Online]. Retrieved from the Internet: https: cloud.google.com looker docs reference param-explore-symmetric-aggregates, (Accessed online Aug. 7, 2025), 6 pages.
Google Cloud Looker, "Understanding symmetric aggregates", [Online]. Retrieved from the Internet: https: cloud.google.com looker docs best-practices understanding-symmetric-aggregates, (Accessed online Aug. 7, 2025), 6 pages.
Lyons, Bethany, "Relationships Data modeling in Tableau", (May 11, 2020), 13 pages.
Snowflake, "Cortex Analyst Paving the Way to Self Service Analytics with AI", [Online]. Retrieved from the Internet: https: www.snowflake.com en blog cortex-analyst-ai-self-service-analytics , (Aug. 15, 2024), 18 pages.
Snowflake Documentation, "Cortex Analyst semantic model specification", [Online]. Retrieved from the Internet: https: docs.snowflake.com user-guide snowflake-cortex cortex-analyst semantic-model-spec#create-a-semantic-model-using-the-model-generator?index=..%2F..index, (Accessed online Aug. 7, 2025), 23 pages.
Summer, Jason, "Translate Existing Semantic Layers for Use by Cortex Analyst", [Online]. Retrieved from the Internet: https: medium.com snowflake translate-existing-semantic-layers-for-use-by-cortex-analyst-2056edbd4753, (Sep. 13, 2024), 16 pages.
Tableau, "About Multi-fact Relationship Data Models", [Online]. Retrieved from the Internet: https: help.tableau.com current pro desktop en-us datasource_mfr_multiple_base_tables.htm, (Accessed online Aug. 7, 2025), 43 pages.
Tableau, "The Tableau Data Model", [Online]. Retrieved from the Internet: https: help.tableau.com current pro desktop en-us datasource_datamodel.htm, (Accessed online Aug. 7, 2025), 11 pages.
"U.S. Appl. No. 19/042,963, Notice of Allowance mailed Feb. 11, 2026", 18 pgs.
"U.S. Appl. No. 19/042,963, Notice of Allowance mailed Oct. 7, 2025", 20 pgs.
Engineering at Zafin, "Bridging the Gap: Exploring use of Natural Language to interact with Complex Systems", [Online] Retrieved from the internet: <https://medium.com/engineering-zafi n/bridging-the-gap-exploring-using-natural-language-to-interact-with-complex-systems-11c1b056cc19>, (Aug. 15, 2023), 23 pages.
Eusebius, Nitin, et al., "Generating value from enterprise data: Best practices for Text2SQL and generative AI", [online]. Retrieved from the Internet: <URL:https://aws.amazon.com/blogs/machine-learning/generating-value-from-enterprise-data-best-practices-for-text2sql-and-generative-ai/ >, (Jan. 4, 2024), 6 pages.

* cited by examiner

QUERY GENERATION BASED ON NATURAL LANGUAGE QUESTION AND SEMANTIC DATA

CROSS-REFERENCE TO RELATED APPLICATIONS

This application claims priority to and the benefit of U.S. Provisional Patent Application No. 63/640,762, entitled "QUERY GENERATION BASED ON NATURAL LANGUAGE QUESTION AND SEMANTIC DATA," filed on Apr. 30, 2024, which is incorporated herein by reference in its entirety.

TECHNICAL FIELD

Embodiments described herein relate to data systems and, more particularly, to systems, methods, devices, and instructions for generating a structured language data query based on a natural language question and semantic data associated with a schema of a data store.

BACKGROUND

Traditionally, interacting with large datasets has involved substantial technical expertise, particularly in database query languages such as structured query language (SQL). This involvement of technical expertise has limited the ability of certain users, such as business users, who are typically not trained in these technical skills, to directly engage with data systems to extract desired data or valuable insights (e.g., business insights) based on stored data.

The advent of natural language processing (NLP) technologies has begun to shift this landscape. Additionally, the integration of artificial intelligence (AI) technologies, such as Large Language Models (LLMs), into data systems has allowed users with little to no technical expertise to interact with databases through natural language. This development has significantly lowered the barrier to entry for business users, enabling them to pose questions to databases in plain language without the need for understanding complex query syntax.

BRIEF DESCRIPTION OF THE SEVERAL VIEWS OF THE DRAWINGS

Various ones of the appended drawings merely illustrate various embodiments of the present disclosure and should not be considered as limiting its scope. In the drawings, which are not necessarily drawn to scale, like numerals may describe similar components in different views. To easily identify the discussion of any particular element or act, the most significant digit or digits in a reference number refer to the figure number in which that element is first introduced.

DETAILED DESCRIPTION

Figure 1:
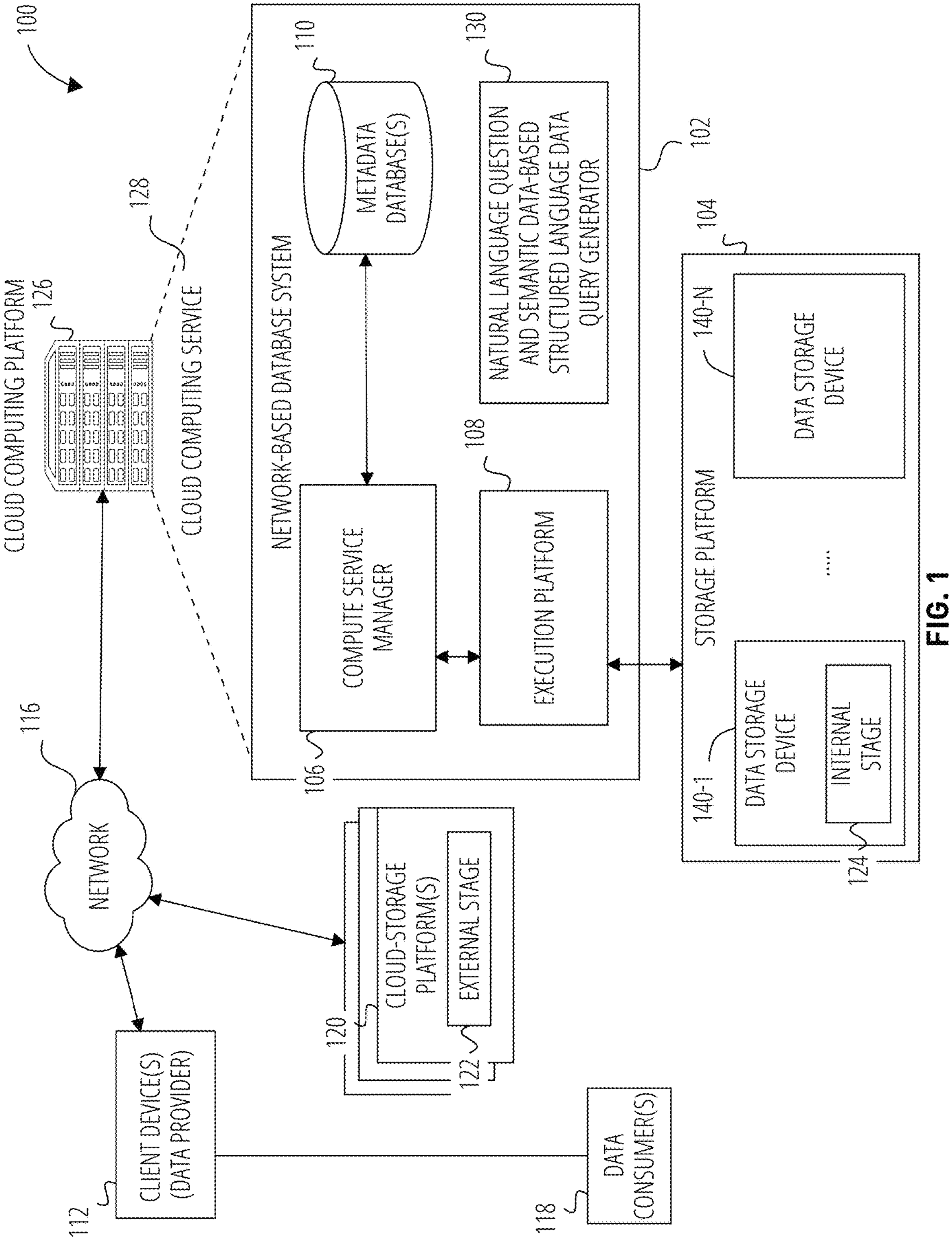
FIG. 1 illustrates an example computing environment that includes a database system in the example form of a network-based database system, according to some embodiments of the present disclosure.

Reference will now be made in detail to specific embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Despite these advancements, at present, the precision of the responses and the ability to handle complex data queries directly in natural language without human (e.g., administrative user or data analyst user) oversight remains challenging. Conventional data systems often involve a 'human or user in the loop' to verify and execute data queries, which can introduce delays and potential for error, particularly in complex data environments. Overall, challenges remain in achieving high levels of accuracy, precision, and user trust in fully automated data systems.

Various embodiments described herein provide for systems, methods, devices, instructions, and like for generating a structured language data query based on a natural language question and semantic data associated with a schema of a data store (e.g., database or the like). According to various embodiments, semantic data comprises a semantic description of (e.g., semantic knowledge regarding) at least a portion of a database schema (or schema) of a data store, such as a database that supports database tables or database views. Various embodiments use semantic data with one or more large language models (LLMs) to interpret natural language inputs comprising one or more natural language questions (e.g., natural language queries), and to generate one or more corresponding structure language queries (e.g., expressed by a data definition language (DDL), such as structured query language (SQL)) that can be performed (e.g., executed) on a data store (e.g., database) to obtain one or more query responses (e.g., comprising numeric or tabular data), which can be provided to users as responses (e.g., natural language outputs) to the natural language inputs. Semantic data (e.g., semantic model) can effectively provide business logic and context-specific information about a schema of data store, and can potentially bridge the gap between the technical implementation of a data store (e.g., database) and the business logic, which in turn can bridge the gap between natural language questions posed by users (e.g., business users) and structured language queries used to obtain data from the data store (e.g., a database). For example, the semantic data can comprise a semantic model that labels a database column not just by its name in the database, such as "cust_id," but also provides a semantic description like "Customer ID," along with a detailed explanation of what the customer ID represents in a business context. Such semantic data can enable a data system to understand and generate responses that are contextually relevant to user's natural language questions. Additionally, the semantic understanding provided by semantic data can improve the accuracy and precision of the generated structured language queries.

Natural language questions received input can comprise both business and non-business questions from a user to be answered by data (e.g., tabular or numerical data) stored on a data store. With respect to business questions, examples can include business questions relating to sales, such as "Which customer resulted in the highest sales yesterday," "Give me a list of the top 5 customers by sales last month," and "Which date had the highest sales in the summer of 2020." Examples can include various business questions relating to advertising, such as "How many total paid impressions do we have for demand partner X," "What's the monthly average cost per click for advertiser Y," and "What's the YOY change in revenue by paid impressions for publisher Z." Examples can include various business questions relating to real estate, such as "Which zip has the highest number of occupied properties," "Which zip has the highest number of occupied properties," "Which states have the highest average amount of space occupied," and "How many buildings were constructed last year and what was their square footage."

For some embodiments, the semantic data comprises a semantic model that comprises a structured representation of at least the portion of the schema of the data store and provides the semantic description of at least the portion of the schema. The semantic model can be defined by one or more logical tables, where an individual logical table of the one or more logical tables is a view of a data store table (e.g., database table) of the data store or a data store view (e.g., database view) of the data store, where the individual logical table comprises one or more logical columns. An individual logical column of the individual logical table references an underlying column of the data store table or the data store view, or an individual logical column of the individual logical table can comprise an expression that references one or more underlying columns of the data store table or the data store view and that defines a derived column. For example, logical tables of the semantic model can comprise one or more dimensions (e.g., non-time dimensions), time dimensions, measures, and filters, which collectively can enhance a data system's understanding of the data structure and context of the schema of the data store. The semantic data (e.g., semantic model) can comprise descriptive names, synonyms (e.g., for columns), detailed explanations (e.g., free-form descriptions of tables or columns), or a combination, which can align more closely with business terminology and user understanding rather than technical schema or code syntax. The semantic data (e.g., semantic model) can be defined in a semantic data file (e.g., content of which is defined in a YAML format or the like), where each semantic data file can comprise a different semantic model. A given schema can be associated with an individual semantic dataset, such as an individual semantic data file. Two schemas can be associated with the same semantic dataset (e.g., the same semantic data file). Semantic data can provide a semantic description for less than all tables or views of a data store, and can provide a semantic description for less than all of a given table or view. For instance, semantic data can comprise a semantic description for only certain, relevant columns of a given table. For various embodiments, the data store comprises a database, or the like, that can store and organize data according to a schema. Additionally, for some embodiments, the data store comprises unstructured data.

According to some embodiments, a data system that implements structured language data query generation as described herein can be integrated into one or more downstream applications, which can allow for a versatile "talk to your data" experience. This integration can provide support for responding to natural language questions (e.g., business questions) using data from a data store (e.g., database), where the natural language questions are from a user (e.g., a business user) who possesses domain knowledge (e.g., business knowledge) but lacks technical expertise in structure language queries (e.g., SQL queries) or databases. Responses generated by various embodiments to natural language questions can enable the user to obtain insights (e.g., business insights) directly from the data without intermediary technical manipulation by the user.

Some embodiments provide an application program interface (API), such as a REST API, configured to facilitate the interaction between one or more front-end applications and a backend data service that implements structured language data query generation as described herein. In this way, the API can enable a front-end or downstream software application to be enabled with a copilot described herein. An API of some embodiments permits the development of a flexible, user-friendly interface that can communicate with complex data backends. Additionally, some embodiments are integrated into an existing software application or tool as a copilot component or tool, which can be presented, for example, via a chat interface (e.g., chat graphical user interface) in the software application/tool. For example, through a chat interface, a user can ask a copilot component/tool to respond to one or more natural language questions based on a selected data store table, data store view, or schema (e.g., copilot can map the selected database table, database view, or schema to corresponding semantic data, generate one or more SQL queries based on a natural language question and the corresponding semantic data, execute the one or more SQL queries, and respond to the natural language question based on resulting SQL output). In this way, the copilot can execute SQL queries in the background automatically without having a user in the loop, and can provide the user with direct answers to their natural language questions (e.g., business questions) via numeric/tabular results combined with an explanation in natural language.

Use of various embodiments can integrate semantic understanding into data systems (e.g., between natural language interfaces and traditional data query mechanisms) to improve the accuracy and relevance of structured language data query generation. Additionally, use of various embodiments can enhance user experience (e.g., of non-technical users), can improve the accuracy of data retrieved from or manipulated by a data store, can facilitate more intuitive interaction between users and complex data systems. Overall, a data system implementing an embodiment described herein can make data interaction more accessible to business users (e.g., allow business users to talk to their business data), which in turn can enhance decision-making capabilities without necessitating deep technical knowledge of structured querying languages.

Though various embodiments are described herein with respect to business users and business use cases, some embodiments can be used with non-business users (e.g., technical users) to generate high-precision structure language queries (e.g., SQL queries) using natural language questions and semantic data, where the high-precision structure language queries can be provided to the non-business user without automatic execution (e.g., so that a technical user can review and modify the SQL query prior to it be executed).

As used herein, a database schema (or schema) can comprise a logical description that defines how data is stored and organized within a database or a data store. A schema can define, for example, an arrangement of tables, fields (e.g., columns), relationships, and other elements. While a schema can serve as a blueprint that outlines how data is stored and organized within the database, a schema usually does not store the data itself. As used herein, a database can store and manage data in accordance with a schema. A database can include one or more schemas that define different ways data is organized and stored within the database. As used herein, a dataset can refer to a data point or data records within a database or datastore.

As used herein, a large language model (LLM) can include, without limitation, a GPT model (e.g., GPT-4), a LLAMA model (e.g., LLAMA-2), a MISTRAL model, a Claude model (e.g., Claude 3) or another type of generative model (e.g., a proprietary or tailored, generative pre-trained transformer). Generally, a LLM comprises one or more transformer neural networks, which can be configured (e.g., trained) for general-purpose language generation or another other natural language processing task.

Reference will now be made in detail to various embodiments of the present disclosure, examples of which are illustrated in the appended drawings. The present disclosure may, however, be embodied in many different forms and should not be construed as being limited to the examples set forth herein.

FIG. 1 illustrates an example computing environment 100 that includes a database system in the example form of a network-based database system 102, according to some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some embodiments, the computing environment 100 may include a cloud computing platform 126 with the network-based database system 102, and a storage platform 104 (also referred to as a cloud storage platform). The cloud computing platform 126 provides computing resources and storage resources that may be acquired (purchased) or leased and configured to execute applications and store data.

The cloud computing platform 126 may host a cloud computing service 128 that facilitates storage of data on the cloud computing platform 126 (e.g., data management and access) and analysis functions (e.g., SQL queries, analysis), as well as other processing capabilities (e.g., configuring replication group objects as described herein). The cloud computing platform 126 may include a three-tier architecture: data storage (e.g., storage platforms 104), an execution platform 108 (e.g., providing query processing), and a compute service manager 106 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 126 could also use a cloud-storage platform as what is referred to herein as an internal storage location concerning the data platform.

From the perspective of the network-based database system 102 of the cloud computing platform 126, one or more files that are stored at one or more storage locations are referred to herein as being organized into one or more of what is referred to herein as either "internal stages" or "external stages." Internal stages (e.g., internal stage 124) are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 126 is in communication with the storage platforms 104 and cloud-storage platforms 120 (e.g., AWS®, Microsoft Azure Blob Storage®, or Google Cloud Storage). The network-based database system 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the network-based database system 102.

The network-based database system 102 comprises a compute service manager 106, an execution platform 108, and one or more metadata databases 110. The network-based database system 102 hosts and provides data reporting and analysis services to multiple client accounts.

The compute service manager 106 coordinates and manages operations of the network-based database system 102. The compute service manager 106 also performs query optimization and compilation as well as managing clusters of computing services that provide compute resources (also referred to as "virtual warehouses"). The compute service manager 106 can support any number of client accounts such as end-users providing data storage and retrieval requests, system administrators managing the systems and methods described herein, and other components/devices that interact with compute service manager 106.

The compute service manager 106 is also in communication with a client device 112. The client device 112 corresponds to a user of one of the multiple client accounts supported by the network-based database system 102. A user may utilize the client device 112 to submit data storage, retrieval, and analysis requests to the compute service manager 106. Client device 112 (also referred to as remote computing device or user client device 112) may include one or more of a laptop computer, a desktop computer, a mobile phone (e.g., a smartphone), a tablet computer, a cloud-hosted computer, cloud-hosted serverless processes, or other computing processes or devices may be used (e.g., by a data provider) to access services provided by the cloud computing platform 126 (e.g., cloud computing service 128) by way of a network 116, such as the Internet or a private network. A data consumer 118 can use another computing device to access the data of the data provider (e.g., data obtained via the client device 112).

In the description below, actions are ascribed to users, particularly consumers and providers. Such actions shall be understood to be performed concerning client device (or devices) 112 operated by such users. For example, a notification to a user may be understood to be a notification transmitted to the client device 112, input or instruction from a user may be understood to be received by way of the client device 112, and interaction with an interface by a user shall be understood to be interaction with the interface on the client device 112. In addition, database operations (joining, aggregating, analysis, etc.) ascribed to a user (consumer or provider) shall be understood to include performing such actions by the cloud computing service 128 in response to an instruction from that user.

The compute service manager 106 is also coupled to one or more metadata databases 110 that store metadata about various functions and aspects associated with the network-based database system 102 and its users. For example, a metadata database 110 may include a summary of data stored in remote data storage systems as well as data available from a local cache. Additionally, a metadata database 110 may include information regarding how data is organized in remote data storage systems (e.g., the cloud storage platform 104) and the local caches. Information stored by a metadata database 110 allows systems and services to determine whether a piece of data needs to be accessed without loading or accessing the actual data from a storage device. In some embodiments, metadata database 110 is configured to store account object metadata (e.g., account objects used in connection with a replication group object).

Figure 3:
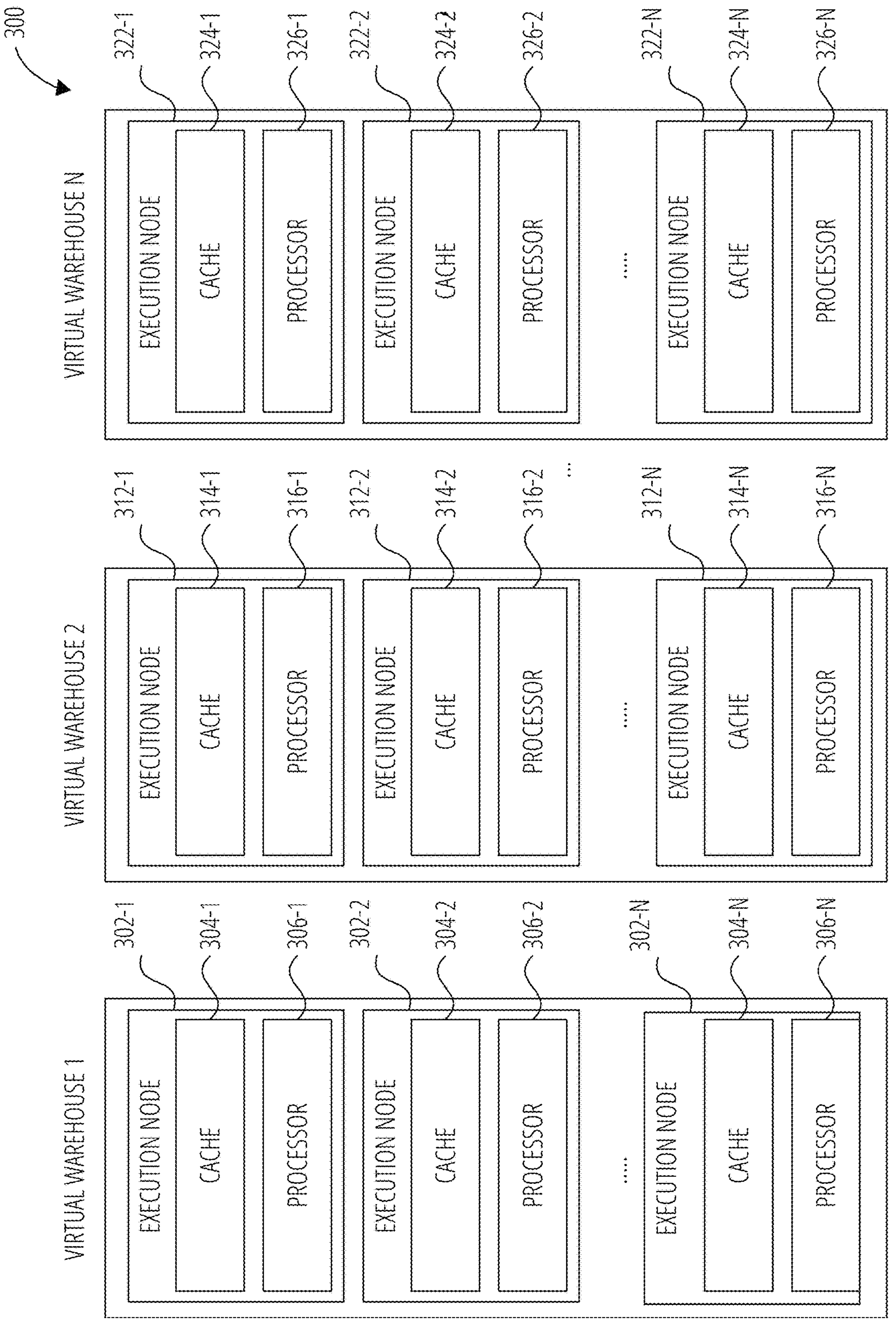
FIG. 3 is a block diagram illustrating components of an execution platform, according to some embodiments of the present disclosure.

The compute service manager 106 is further coupled to the execution platform 108, which provides multiple computing resources that execute various data storage and data retrieval tasks. As illustrated in FIG. 3, the execution platform 108 comprises a plurality of compute nodes. The execution platform 108 is coupled to storage platform 104 and cloud-storage platforms 120. The storage platform 104 comprises multiple data storage devices 140-1 to 140-N. In some embodiments, the data storage devices 140-1 to 140-N are cloud-based storage devices located in one or more geographic locations. For example, the data storage devices 140-1 to 140-N may be part of a public cloud infrastructure or a private cloud infrastructure. The data storage devices 140-1 to 140-N may be hard disk drives (HDDs), solid-state drives (SSDs), storage clusters, Amazon S3™ storage systems, or any other data-storage technology. Additionally, the cloud-storage platforms 104 may include distributed file systems (such as Hadoop Distributed File Systems (HDFS)), object storage systems, and the like. In some embodiments, at least one internal stage 124 may reside on one or more of the data storage devices 140-1 to 140-N, and at least one external stage 122 may reside on one or more of the cloud-storage platforms 120.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternative embodiments, these communication links are implemented using any type of communication medium and any communication protocol.

The compute service manager 106, metadata database(s) 110, execution platform 108, and storage platform 104, are shown in FIG. 1 as individual discrete components. However, each of the compute service manager 106, metadata database(s) 110, execution platform 108, and storage platform 104 may be implemented as a distributed system (e.g., distributed across multiple systems/platforms at multiple geographic locations). Additionally, each of the compute service manager 106, metadata database(s) 110, execution platform 108, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 106. These jobs are scheduled and managed by the compute service manager 106 to determine when and how to execute the job. For example, the compute service manager 106 may divide the job into multiple discrete tasks and may determine what data is needed to execute each of the multiple discrete tasks. The compute service manager 106 may assign each of the multiple discrete tasks to one or more nodes of the execution platform 108 to process the task. The compute service manager 106 may determine what data is needed to process a task and further determine which nodes within the execution platform 108 are best suited to process the task. Some nodes may have already cached the data needed to process the task and, therefore, be a good candidate for processing the task. Metadata stored in a metadata database 110 assists the compute service manager 106 in determining which nodes in the execution platform 108 have already cached at least a portion of the data needed to process the task. One or more nodes in the execution platform 108 process the task using data cached by the nodes and, if necessary, data retrieved from the storage platform 104. It is desirable to retrieve as much data as possible from caches within the execution platform 108 because the retrieval speed is typically much faster than retrieving data from the storage platform 104.

As shown in FIG. 1, the cloud computing platform 126 of the computing environment 100 separates the execution platform 108 from the storage platform 104. In this arrangement, the processing resources and cache resources in the execution platform 108 operate independently of the data storage devices 140-1 to 140-N in the storage platform 104. Thus, the computing resources and cache resources are not restricted to specific data storage devices 140-1 to 140-N. Instead, all computing resources and all cache resources may retrieve data from, and store data to, any of the data storage resources in the storage platform 104.

As also shown, the network-based database system 102 comprises natural language question and semantic data-based structured language data query generator 130 (hereafter, referred to as structured language data query generator 130), which is configured to implement generation of a structured language data query based on a natural language question and semantic data associated with a schema of a data store (e.g., database or the like), where the data store can be stored on the storage platform 104.

With respect to generation or creation of semantic data (e.g., comprising a semantic model) for an individual schema, a user (e.g., administrative user or an analyst user) can generate (e.g., by manually entering or defining) the semantic data (e.g., as a semantic data file) based on one or more specific use cases. For each use case of interest, the user can identify a list of 10 to 20 natural language questions the user would expect a copilot to answer based on the semantic data and the schema associated with the semantic data. For some embodiments, an individual schema can have multiple different semantic models generated for it, with each semantic model being configured for a particular use case. For example, one semantic model for a given schema can be generated for answering natural language questions relating to sales analytics, and another semantic model for the same schema can be generated for answering natural language questions relating to marketing analytics. An end user, such as a business user, can select the semantic model to be used by the copilot when answering the end user's natural language questions. According to some embodiments, a semantic model generator is provided, which is configured to automatically generate one or more semantic models for a given schema or a select list of tables (of a data store) described by the given schema.

Table 1 below provides example user commands for creating a semantic model for a schema on the structured language data query generator 130 in accordance with various embodiments described herein. Once the semantic model is created (e.g., using the example user commands), the semantic model appears in a list of semantic models selected by a user, such as a business user, prior to submitting a natural language question (e.g., to a copilot).

TABLE 1

```
-- Create the database and schema CREATE DATABASE SEMANTIC_MODEL;
CREATE SCHEMA SEMANTIC_MODEL.DEFINITIONS;
GRANT USAGE ON DATABASE SEMANTIC_MODEL TO ROLE PUBLIC;
GRANT USAGE ON SCHEMA SEMANTIC_MODEL.DEFINITIONS TO ROLE PUBLIC;
USE SEMANTIC_MODEL.DEFINITIONS;
-- Create the first stage.
CREATE STAGE MY_STAGE ENCRYPTION = (TYPE = 'SNOWFLAKE_SSE')
DIRECTORY = (ENABLE = TRUE);
GRANT READ ON STAGE MY_STAGE TO ROLE PUBLIC;
-- Create the second stage.
CREATE STAGE SALES ENCRYPTION = (TYPE = 'SNOWFLAKE_SSE') DIRECTORY =
(ENABLE = TRUE);
GRANT READ ON STAGE SALES TO ROLE SALES_ANALYST;
```

The following Table 2 provides a specification (e.g., YAML specification) for defining a semantic model within a semantic data file, such as a YAML file, in accordance with various embodiments. The overall structure and concepts of the semantic model can be quite similar to those in a data store (e.g., database), but permits a user to provide more semantic information about various artifacts of a data store (e.g., database). Hereafter, a data store artifact (e.g., database artifact), such as a table, view, or column, can be referred to as a "physical" artifact, and a semantic model artifact can be referred to as a "logical" artifact.

TABLE 2

SemanticModel: A semantic model is a collection of logical tables. A logicaltable can thus choose to selectively expose only the relevant columns of the underlying physical table and can also expose new derived columns that are expressions over the underlying physical columns.
  tables: List[LogicalTable]
LogicalTable: A logical table is a view over a database table or view. Each logical table can comprise a collection of logical columns, which can be categorized into dimensions, time_dimensions, and measures. A logical column can either be a simple reference to an underlying physical column or it can be a simple non-aggregate expression containing one or more physical columns, such as a string or simple mathematical operation.
  dimensions: List[Dimension]
  time_dimensions: List[TimeDimension]

TABLE 2-continued measures: List[Measure]
filters: List[Filter]
Dimension: A dimension contains categorical values (e.g., state, user_type, platform).
TimeDimension: A time dimension contains time values (e.g., sale_date, created_at, year).
Measure: A measure contains numerical values (e.g., revenue, impressions, salary).
Filter: A filter represents a SQL expression used for filtering.
PhysicalTable: A physical table is used to represent a fully-qualified table name.

SemanticModel

It can have the following fields:
name: A descriptive name for this semantic model. Must be unique.
description: A free-form description of this semantic model, including details of what kind of analysis it's useful for.
tables (LogicalTable): A list of logical tables in this semantic model.

LogicalTable

It can have the following fields:
name: A descriptive name for this table. Must be unique.
physical_table (PhysicalTable): A fully qualified name of the underlying physical table in the database.
synonyms: A list of other terms/phrases used to refer to this table. Must be unique across all synonyms in this semantic model.
description: A free-form description of this table that'll help someone writing queries over this table.
dimensions (Dimension): A list of dimension columns in this table.
time_dimensions (TimeDimension): A list of time dimension columns in this table.
measures (Measure): A list of measures in this table.
filters (Filter): Predefined filters on this table, if any.

Dimension

It can have the following fields:
name: A descriptive name for this dimension. Must be unique.
expr: The SQL expression for this dimension. Could either be a simple reference to a physical column or a SQL expression with one or columns from the underlying physical table.
synonyms: A list of other terms/phrases used to refer to this dimension. Must be unique across all synonyms in this semantic model.
description: A free-form description about this dimension, including what data it has. Provide information that'll help someone writing queries using this table.
unique: If true, assume that this column has unique values.
sample_values: Sample values of this column, if any. Add any values that are likely to be referenced in the user questions.

TimeDimension

It can have the following fields:
name: A descriptive name for this time dimension. Must be unique.
expr: The SQL expression for this column. Could either be a simple reference to a physical column or a SQL expression with one or columns from the underlying physical table.
synonyms: A list of other terms/phrases used to refer to this time dimension. Must be unique across all synonyms in this semantic model.
description: A free-form description about this dimension, including what data it has. Provide information that'll help someone writing queries using this table. For example, for datetime columns, specify the timezone of the data.
unique: If true, assume that this column has unique values.
sample_values: Sample values of this column, if any. Add any values that are likely to be referenced in the user questions.

Measure

It can have the following fields:
name: A descriptive name for this measure. Must be unique.
expr: The SQL expression for this measure. Could either be a simple reference to a physical column or a SQL expression with one or columns from the underlying physical table.
synonyms: A list of other terms/phrases used to refer to this measure. Must be unique across all synonyms in this semantic model.
description: A free-form description about this measure, including what data this column has. Provide information that'll help someone writing queries using this table.
unique: If true, assume that this column has unique values.
default_aggregation: The default aggregation applied to this column in the context of a grouping. Only applicable to measure columns. Options: sum, avg, min, max, median, count, count_distinct, etc.
sample_values: Sample values of this column, if any. Add any values that arelikely to be referenced in the user questions.

Filter

It can have the following fields:
name: A descriptive name for this filter. Must be unique.
expr: The SQL expression of this filter, referencing physical columns.
synonyms: A list of other terms/phrases used to refer to this filter. Must be unique across all synonyms in this semantic model.
description: A free-form description about this filter, including details of what this filter is typically used for.

TABLE 2-continued

| PhysicalTable |
|---|
| It can have the following fields:<br>database: Name of the database.<br>schema: Name of the schema.<br>table: Name of the table. |

Depending on the embodiment, the semantic model can be defined using names and synonyms that are closer to vocabulary likely to be used by a copilot user. Details used in a description field can be helpful to someone writing queries on a dataset of a data store.

The following Table 3 provides the content of an example YAML file that defines an example semantic model for an example schema, which can be used (to generate a structured language data query) by the structured language data query generator 130.

TABLE 3

Example schema:

```
CREATE TABLE sales.public.sd_data (
 id SERIAL PRIMARY KEY,
 dt DATETIME,
 cat VARCHAR(255), loc VARCHAR(255), cntry VARCHAR(255)
 chn VARCHAR(50),
amt DECIMAL(10, 2),
 unts INT,
 cst DECIMAL(10, 2)
);
```

Example content of YAML file:

```
# Name of the Semantic Model.
name: Sales Data
description: This semanticmodel can be used for asking questionsover
the sales data.
# A semanticmodel can contain one or more tables. tables:
 # Table 1: A logical table over the 'sd_data' physical table.
 - name: sales_data
 # A description of the logical table.
 description: A logicaltable capturing dailysales information across
 different store
locations and product categories.
 # The fullyqualified name of the underlying physical table.
 physical_table:
  database: sales
  schema: public
  table: sd_data
      dimensions:
  - name: product_category
  # Synonyms shouldbe unique acrossthe entire semanticmodel.
  synonyms: ["item_category", "product_type"]
  description: The categoryof the product sold. expr: cat
  unique: false
  -name: store_country
   description: The country where the sale took place.
```

TABLE 3-continued

```
  expr: cntry
  unique: false
 -name: sales_channel
  synonyms: ["channel", "distribution_channel"]
  description: The channel throughwhich the sale was made.
  expr: chn
  unique: false
time_dimensions:
 -name: sale_timestamp
  synonyms: ["time_of_sale", "transaction_time"]
  description: The time when the sale occurred. In UTC. expr: dt
  unique: false
measures:
 -name: sales_amount
  synonyms: ["revenue", "total_sales"]
  description: The totalamount of moneygenerated from the sale.
  expr: amt
  default_aggregation: sum
 -name: sales_tax
  description: The sales tax paid for this sale. expr: amt * 0.0975
  default_aggregation: sum
 -name: units_sold
       synonyms: ["quantity_sold", "number_of_units"]
  description: The numberof units sold in the transaction.
  expr: unts
  default_aggregation: sum
 -name: cost
  description: The cost of the product sold. expr: cst
  default_aggregation: sum
 -name: profit
  synonyms: ["earnings", "net income"]
  description: The profitgenerated from a sale. expr: amt - cst
  default_aggregation: sum
# A table can define commonly used filters over it. These filters can then
be referenced in
user questions directly.
 filters:
 -name: north_america
  synonyms: ["North America", "N.A.", "NA"]
  description: "A filter to restrict only to north american countries"
  expr: cntry IN ('canada', 'mexico', 'usa')
```

The following Table 4 provides a specification for an API (e.g., a stateless API, such as a REST API) that can be provided by structured language data query generator 130 in accordance with various embodiments. While Table 4 describes a REST API, some embodiments provide for a stateful API, where prior messages are stored and can be used as context when generating new responses.

TABLE 4

Create Copilot

POST copilots
Request

```
{
  "name": "my_copilot_123", "context": [
    {
      "type": "semantic_model",
      "file": "@my_stage.my_model_1.yaml"
    },
    {
      "type": "semantic_model",
      "file": "@my_stage.my_model_2.yaml"
```

TABLE 4-continued

| |
|---|
| } ] } |
| Create Chat |
| POST copilots/my_copilot_123/chats |
| Request |
| { "name": "my_chat_123" } |
| Send Message |
| POST api/{version}/databases/{database}/schemas/{schema}/copilots/{stage}/chats/-/messages<br>This API endpoint can cause generation of a structured language (e.g., SQL) query, for a user's natural language question, using a semantic model provided in a request that is included in the message. The request in the messages can include a user's natural language question and a selection of a semantic model (e.g., via a model path) under the role of "user," and the response in the messages can include a chat history, which can include a copy of the request and response content (e.g., a SQL query and an explanation of the SQL query) under the role of "copilot." Each message in the chat history can have multiple content blocks of different types (e.g., text and SQL). The request |
| Request in Message (API Input) |
| The following can represent the body of the request in the message. |
| Response in Message (API Output) |

```
{
  "role": "user",
  "content": [
    {
      "type": "text",
      "text": "Which company had the most revenue?"
    }
  ]
  "model_path": "my_semantic_model.yaml"
}
```

Response in Message (API Output)

The following can represent the body of a response to the request. The content of the response can have multiple content blocks of different types (e.g.,

```
{
  "messages": [
    {
      "role": "user",
      "content": [
        {
          "type": "text",
          "text": "This is the natural language question. Which company had the most
revenue?"
        }
      ]
    },
    {
      "role": "copilot",
      "content": [
        {
          "type": "text",
          "text": "This is the explanation of the structured language data query. We interpreted
your questions as ..."
        },
        {
          "type": "sql",
            "statement": "SELECT * FROM table",
            "query_id": "01b31445-0001-c9a9-0000-0809003b2a7a"
        }
      ]
    }
  ]
}
```

The following Table 4 provides an example of a suggestion generated in response to structured language data query generator 130 receiving a user's natural language question and the structured language data query generator 130 determining that the user's natural language question is categorized as an unanswerable question category (e.g., such as being unambiguous). For example, when an ambiguous natural language question is sent (e.g., via an API), a copilot of an embodiment can reject generating a structured language data query (e.g., SQL query) for that ambiguous natural language question and instead reply with one or more similar natural language questions that are not ambiguous. The response in Table 5 can be a JavaScript Object Notation (JSON) string preceded by a <SUGGESTION> tag, with content-type text. An example question like "What is the best product?" can result in the response below, which can return as a structured output with new content type suggestions.

TABLE 5

<SUGGESTION>[{
"explanation": "I'm sorry for the confusion, but the term 'best product' could be interpreted in multiple ways. It could mean the product with the highest sales, the highest profit margin, or the most popular among customers. Could you please provide more details?", TABLE 5-continued "suggestions": [
"What is the product with the highest sales?",
"What is the product with the highest profit margin?", "What is the most popular product among customers?"
]
}]

The following Table 6 provides example categories of natural language questions used by structured language data query generator 130 in accordance with various embodiments described herein.

TABLE 6

| Question Category: | Description: | Example: |
|---|---|---|
| Answerable | A natural language question can be categorized as answerable if the natural language question can unambiguously be answered by a structured language data query (e.g., SQL query). | |
| Unanswerable - Missing context | The question cannot be answered from the provided semantic model. | "Which state had the highest transaction count in 2020?", if the table doesn't have any data about "state". |
| Unanswerable - Prediction question | The question that cannot be answered without creating a prediction. | "Which transaction type is likelyto gross the highest total amount next year?" |
| Unanswerable - Non-SQL question | The question is a valid data question but cannot be answered using a structured language data query (e.g., SQL query) alone. | "How much would my revenue increase if I spent $100 more on GoogleAds?" |
| Unanswerable - Non-data question | The input is either not a question or a question that cannot be answered by writing a structured language data query (e.g., SQL query) over the given schema. | "Who won the most super bowls in the past 5 years?", if there is no data about this in the underlying tables. |
| Unanswerable - Ambiguous question | There are multiple possible interpretations of the question. | "Show me top 5 transactions from last week", since it's not clear what measure to use for "top 5" calculation. |

The following Table 7 provides API messages generated during example conversations between a user and a copilot enabled or otherwise facilitated by the structured language data query generator 130 in accordance with described herein.

TABLE 7

| Role | API Messages | Natural Language Question Category |
|---|---|---|
| User | What is the total revenue generated by each domain in the last month? | Answerable |
| Copilot | This is our interpretation of your question: What is the total revenue generated by each domain in the month before the current month? Here is the output of a SQL query that answers your question. The data represents the total revenue generated by each domain in the month before the current month. The domains are sorted in descending order by the total revenue, with the domain that generated the highest revenue at the top. | |

| DOMAIN: | TOTAL REVENUE: |
|---|---|
| example.com | 10,234,211 |
| domain.com | 8,133,124 |

TABLE 7-continued

| Role | API Messages | Natural Language Question Category |
|---|---|---|
| | test.com 7,350,864 | |
| User | What is the proportion of revenue coming from different geographical regions? | Unanswerable - Missing context |
| Copilot | I'm sorry, but the current schema does not provide enough context to answer your question. The 'GEOID' field in the schema represents a geographical region, but there is no information or mapping available to link these IDs to actual geographical regions. Therefore, it's not possible to calculate the proportion of revenue coming from different geographical regions.<br>Here are some questions you can ask:<br>Question 1<br>Question 2<br>Question 3 | |
| User | Can you predict the best ad formats by revenue and impressions? | Unanswerable - Prediction question |
| Copilot | I'm sorry, but the question you asked requires predictive analysis, which is not possible with SQL alone. SQL is used for data manipulation and extraction, not for predictive modeling. To predict the best ad formats by revenue and impressions, you would need to use machine learning or statistical modeling techniques.<br>Here are some questions you can ask:<br>Question 1<br>Question 2<br>Question 3 | |
| User | How much would revenue increase if I spent $100 more on Google Ads? | Unanswerable - Non-SQL question |
| Copilot | I'm sorry, but the question you asked requires a predictive analysis which cannot be performed using SQL alone. SQL is used for data extraction and manipulation, not for predictive modeling or what-if analysis. To answer your question, you would need to use a predictive model that takes into account the relationship between ad spend and revenue, which is beyond the capabilities of SQL.<br>Here are some questions you can ask:<br>Question 1<br>Question 2<br>Question 3 | |
| User | Who is the president of the United States? | Unanswerable - Non-data question |
| Copilot | I'm sorry, but the question you asked is not related to the data available in the provided schema. The schema does not contain any information about political figures or positions. It is primarily focused on advertising data.<br>Here are some questions you can ask:<br>Question 1<br>Question 2<br>Question 3 | |
| User | What is the total revenue generated recently? | Unanswerable - Ambiguous question |
| Copilot | I'm sorry for the inconvenience, but the term 'recently' in your question is ambiguous. It could refer to the last day, week, month, or year. Could you please specify the time period you're interested in?<br>Here are some questions you can ask:<br>Question 1<br>Question 2<br>Question 3 | |

The structured language data query generator 130 can enable a user (e.g., a business user) to trust responses (e.g., answers) generated by the structured language data query generator 130. For some embodiments, a user can have an answer escalated for verification by another user, such as an analyst user, who can verify existing and contribute one or more new answers. Responses (e.g., answers), when verified (e.g., automatically or by an analyst user), can be presented to the user (e.g., via a graphical user interface, such as a chat interface) as a verified response (e.g., with a graphical indication, such as a check mark).

According to some embodiments, the structured language data query generator 130 uses memory with respect to one or more large language models, which can permit user input and responses to persist across multiple sessions. This can permit automatic extraction and persistence of input and responses, which can be stored to build a repository of "verified" natural language questions and answers, which the structured language data query generator 130 can draw from whenever a user asks a natural language question similar to one of the natural language questions in the repository. For some embodiments, a user (e.g., a business user) can provide custom instructions that are used across sessions.

For some embodiments, the structured language data query generator 130 uses a semantic model to match string literals by allowing a user to specify a set of sample values. This can be used with an indexed search service that can index multiple values in a particular column and use retrieval to find the relevant values at inference time.

For various embodiments, a response generated by the structured language data query generator 130 can comprise a numeric/tabular query result, which can be graphically visualized and presented (e.g., in a graphical user interface, such as a chat interface) to a user with the numeric/tabular query result.

According to various embodiments, the structured language data query generator 130 provides a set of connectors that enable a user to import one or more models (e.g., generated outside the structured language data query generator 130) as semantic models usable by the structured language data query generator 130.

For some embodiments, the structured language data query generator 130 uses an indexed search service that enables the structured language data query generator 130 to use structured (e.g., stored on a database) and unstructured data. A user can facilitate this by specifying both a semantic model and a search engine when the user creates (e.g., generates) a copilot.

Figure 2:
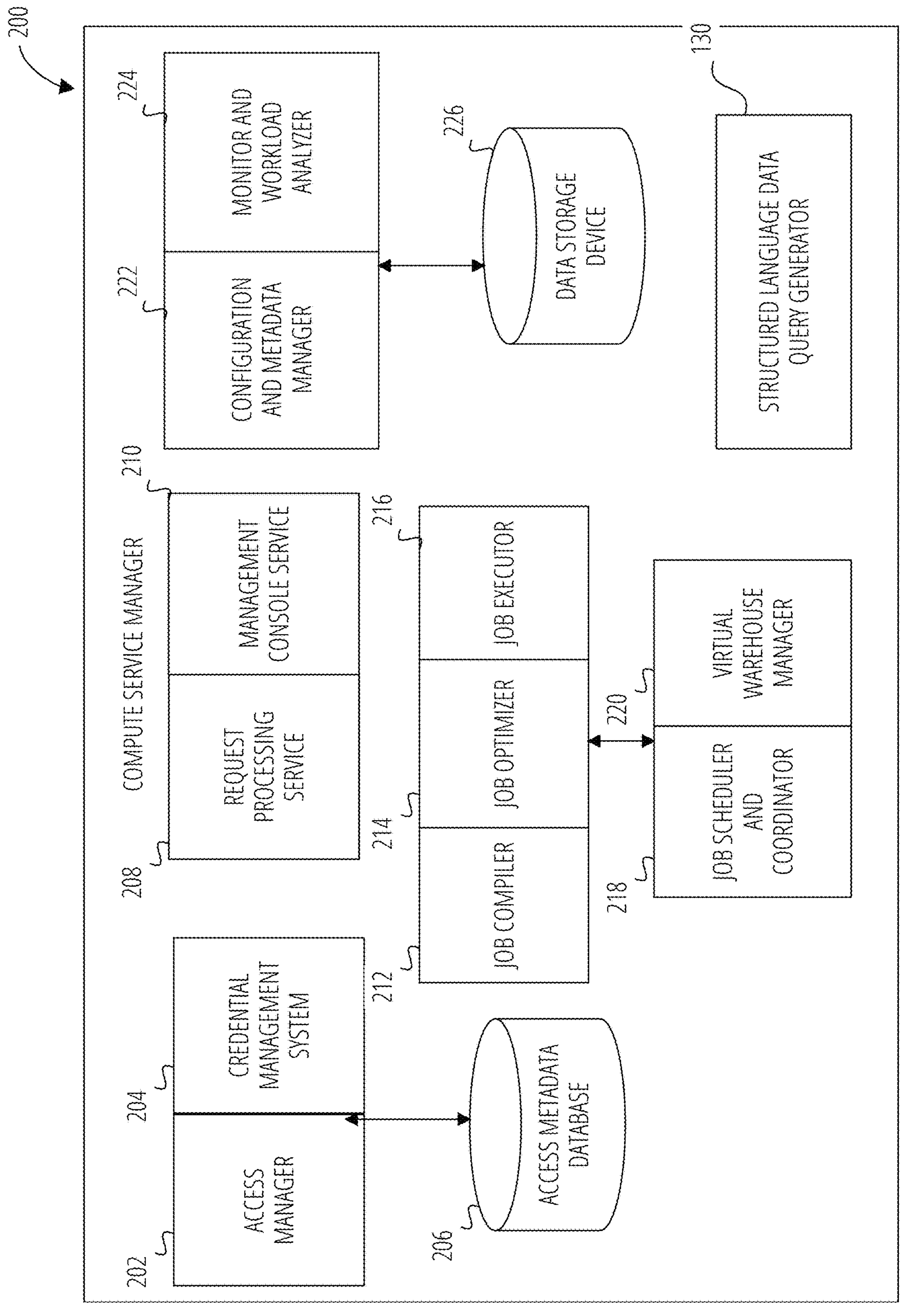
FIG. 2 is a block diagram illustrating components of a compute service manager, according to some embodiments of the present disclosure.

FIG. 2 is a block diagram 200 illustrating components of the compute service manager 106, in accordance with some embodiments of the present disclosure. As shown in FIG. 2, the compute service manager 106 includes an access manager 202 and a credential management system 204 coupled to access access metadata database 206, which is an example of the metadata database(s) 110.

Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data can be stored in a cache within the execution platform 108 or in a data storage device in storage platform 104.

A management console service 210 supports access to various systems and processes by administrators and other system managers. Additionally, the management console service 210 may receive a request to execute a job and monitor the workload on the system.

The compute service manager 106 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 106.

A job scheduler and coordinator 218 sends received jobs to the appropriate services or systems for compilation, optimization, and dispatch to the execution platform 108. For example, jobs can be prioritized and then processed in that prioritized order. In an embodiment, the job scheduler and coordinator 218 determines a priority for internal jobs that are scheduled by the compute service manager 106 with other "outside" jobs such as user queries that can be scheduled by other systems in the database but may utilize the same processing resources in the execution platform 108. In some embodiments, the job scheduler and coordinator 218 identifies or assigns particular nodes in the execution platform 108 to process particular tasks. A virtual warehouse manager 220 manages the operation of multiple virtual warehouses implemented in the execution platform 108. For example, the virtual warehouse manager 220 may generate query plans for executing received queries.

Additionally, the compute service manager 106 includes a configuration and metadata manager 222, which manages the information related to the data stored in the remote data storage devices and in the local buffers (e.g., the buffers in execution platform 108). The configuration and metadata manager 222 uses metadata to determine which data files need to be accessed to retrieve data for processing a particular task or job. A monitor and workload analyzer 224 oversees processes performed by the compute service manager 106 and manages the distribution of tasks (e.g., workload) across the virtual warehouses and execution nodes in the execution platform 108. The monitor and workload analyzer 224 also redistributes tasks, as needed, based on changing workloads throughout the cloud computing platform 126 and may further redistribute tasks based on a user (e.g., "external") query workload that may also be processed by the execution platform 108. The configuration and metadata manager 222 and the monitor and workload analyzer 224 are coupled to a data storage device 226. Data storage device 226 in FIG. 2 represents any data storage device within the storage platform 104. For example, data storage device 226 may represent buffers in execution platform 108, storage devices in cloud storage platform 104, or any other storage device.

As described in embodiments herein, the compute service manager 106 validates all communication from an execution platform (e.g., the execution platform 108) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

FIG. 3 is a block diagram 300 illustrating components of the execution platform 108, in accordance with some embodiments of the present disclosure. As shown in FIG. 3, the execution platform 108 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 108 can add new virtual warehouses and drop existing virtual warehouses in real-time based on the current processing needs of the systems and users. This flexibility allows the execution platform 108 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 140-1 to 140-N shown in FIG. 1. Thus, the virtual warehouses are not necessarily assigned to a specific data storage device 140-1 to 140-N and, instead, can access data from any of the data storage devices 140-1 to 140-N within the storage platform 104. Similarly, each of the execution nodes shown in FIG. 3 can access data from any of the data storage devices 140-1 to 140-N. In some embodiments, a particular virtual warehouse or a particular execution node can be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 108, the virtual warehouses can be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse can be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 108 is also fault tolerant. For example, if one virtual warehouse fails, that virtual warehouse is quickly replaced with a different virtual warehouse at a different geographic location. A particular execution platform 108 may include any number of virtual warehouses. Additionally, the number of virtual warehouses in a particular execution platform is dynamic, such that new virtual warehouses are created when additional processing and/or caching resources are needed. Similarly, existing virtual warehouses can be deleted when the resources associated with the virtual warehouse are no longer useful.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
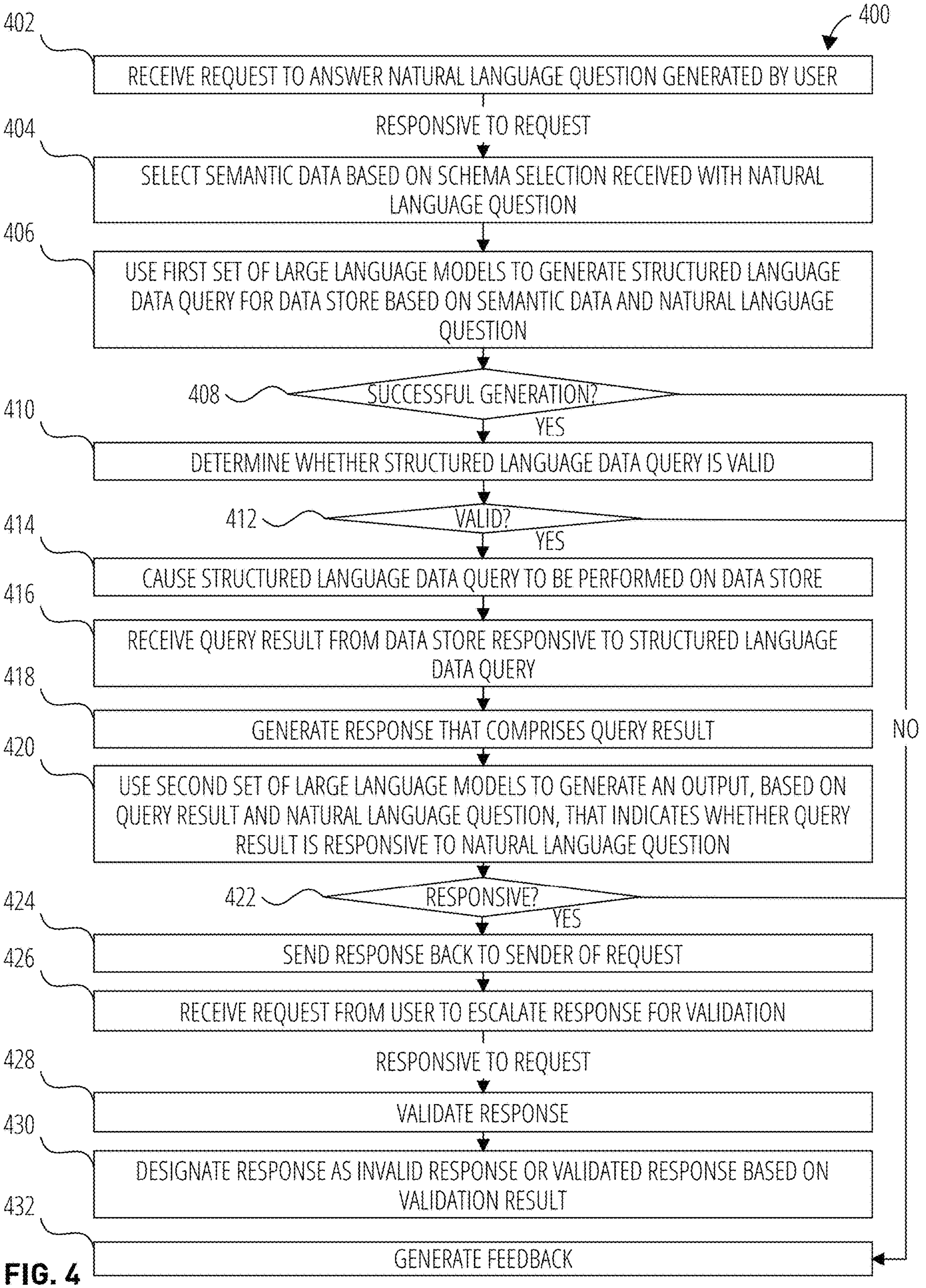
FIG. 4 is a flowchart of an example method for generating a structured language data query based on a natural language question and semantic data associated with a schema of a data store, according to some embodiments of the present disclosure.

FIG. 4 is a flowchart of an example method 400 generating a structured language data query based on a natural language question and semantic data associated with a schema of a data store, according to some embodiments of the present disclosure. Method 400 may be embodied in computer-readable instructions for execution by one or more hardware components (e.g., one or more processors) such that the operations of method 500 can be performed by components of the structured language data query generator 130 or the network-based database system 102, such as a network node (e.g., the structured language data query generator 130 executing on a network node of the compute service manager 106) or a computing device (e.g., client device 112), one or both of which may be implemented as machine 800 of FIG. 8 performing the disclosed functions. Accordingly, method 400 is described below, by way of example with reference thereto. However, it shall be appreciated that method 400 may be deployed on various other hardware configurations and is not intended to be limited to deployment within the network-based database system 102.

At operation 402, a hardware processor (e.g., implementing the structured language data query generator 130) receives a request to answer a natural language question generated by a user. For some embodiments, the first user input is received via a graphical user interface (e.g., chat interface), where the hardware processor (e.g., of the structured language data query generator 130) causes the graphical user interface to be displayed on a client device (e.g., client device 112). For some example embodiments, a multi-turn natural language question or conversation is received from a user, and the multi-turn natural language question/conversation is converted to a single-turn natural language question using a LLM. According to various example embodiments, the multi-turn natural language question/conversation comprises at least one prior natural language question and corresponding generated answer (or response), and a recent natural language question (e.g., that the user wants answered). Where the single-turn question is generated, it becomes the natural language question used by method 400.

In response to the request received by operation 402, during operation 404, the hardware processor (e.g., implementing the structured language data query generator 130) selects semantic data based on a schema selection received with the natural language question (e.g., in the request). Alternatively, a database table or database view selection can be received with the natural language question (instead of a schema selection), a schema associated with the database table or the database view can be determined (e.g., identified), and the semantic data can be selected based on the determined (e.g., identified) schema.

At operation 406, the hardware processor (e.g., implementing the structured language data query generator 130) uses a first set of large language models to generate a structured language data query for a data store based on semantic data and the natural language question. For some embodiments, the semantic data comprises a semantic description of at least a portion of a schema of the data store. For various example embodiments, operation 406 comprises a database search to determine (e.g., find or identify) one or more database-provided values for one or more user-provided terms in the natural language question, and use (e.g., replace) those one or more user-provided terms with the one or more database-provided values prior to using the first set of large language models to generate the structured language data query based on the semantic data and the natural language question. For instance, where the natural language question includes a user-provided term of "the Acme company," example embodiment can determine (e.g., find or identify) a database-provided value of "Acme, Inc." and use the database-provided value in place of the user-provided term. In this way, some example embodiments help bridge the gap between user-provided terms and actual database values and improves query accuracy (e.g., by enabling use of proper database values in filters). The database providing the one or more database-provided values can comprise a vector database.

For some embodiments, operation 406 comprises using the first set of large language models to generate the structured language data query and an explanation of the structured language data query based on semantic data and the natural language question, where the response comprises at least a portion of the explanation. For some embodiments, operation 406 comprises using a first large language model of the set of large language models to generate a first output based on the semantic data and the natural language question, where the first output indicates a category for the natural language question (e.g., example categories listed in Table 6). In response to the category indicating that the natural language question is answerable using the schema and the data store, during operation 406, a second large language model can be used to generate a second output based on the semantic data and the natural language question, where the second output comprises the structured language data query. In particular, a second large language model can be used to generate the second output based on the semantic data, the natural language question, and metadata for the data store (e.g., table data definition language (DDL)). Alternatively, in response to the category indicating that the natural language question is not answerable using the schema and the data store, during operation 406, a response can be generated to comprise feedback and the response can be sent back to the sender, where the feedback can be provided in the first output generated by the first large language model. The feedback can comprise, for example, one or more suggestions (e.g., suggested questions) that the user can use in place of the natural language question. Examples of suggestions are illustrated herein by Table 5.

At decision point 408, method 400 proceeds to operation 410 in response to the set of large language models successfully generating the structured language data query, otherwise method 400 proceeds to operation 432.

During operation 410, the hardware processor (e.g., implementing the structured language data query generator 130) determines whether the structured language data query is valid. At decision point 412, method 400 proceeds to operation 414 in response to determining that the structured language data query is valid, otherwise method 400 proceeds to operation 432.

At operation 414, the hardware processor (e.g., implementing the structured language data query generator 130) causes the structured language data query to be performed on the data store, at operation 416, the hardware processor receives a query result (e.g., numerical or tabular data) from the data store responsive to the structured language data query, and at operation 418, the hardware processor generates a response that comprises the query result and that is responsive to request. Thereafter, at operation 420, the hardware processor (e.g., implementing the structured language data query generator 130) uses a second set of large language models to generate an output based on the query result and the natural language question, where the output indicates whether the query result is responsive to the natural language question. In particular, a second set of large language models can be used to generate an output based on the natural language question, the structured language data query, and an explanation of the structured language data query. In this way, operation 420 can perform a sanity check on the query result. At decision point 422, method 400 proceeds to operation 424 in response to the query result being responsive to the natural language question, otherwise method 400 proceeds to operation 432. During decision point 422, the hardware processor (e.g., implementing the structured language data query generator 130) sends the response back to a sender of the request. Where the request is received at operation 402 as input to an application program interface (API), and the sending of the response back to a sender of the request can comprise returning the response as output of the API. The API can be in accordance with the example API specification described in Table 3.

Subsequently, at operation 426, the hardware processor (e.g., implementing the structured language data query generator 130) receives a request from the user to escalate the response for validation. In response to the request, at operation 428, the hardware processor (e.g., implementing the structured language data query generator 130) validates the response, and at operation 430, the hardware processor designates the response as an invalid response or a validated response based on a validation result. For instance, a request received from the user can be used to escalate the response to a second user for validation, and after the validation by the second user, the response can be designated as a validated response or an invalid response based on a validation result from the validation. In another example, prior to sending the response to the sender, the response can be compared against one or more prior responses to validate the response and, in response to determining that the response is valid, designating the response as a validated response.

During operation 432, the hardware processor (e.g., implementing the structured language data query generator 130) generates feedback that is sent back to the sender, where the feedback can indicate what caused operation 432 to be performed. For example, the feedback can indicate if a structured language data query (e.g., SQL query) is not successfully generated, if the structured language data query generated is not valid, or if a response generated based on a query result is not responsive to the natural language question.

Figure 5:
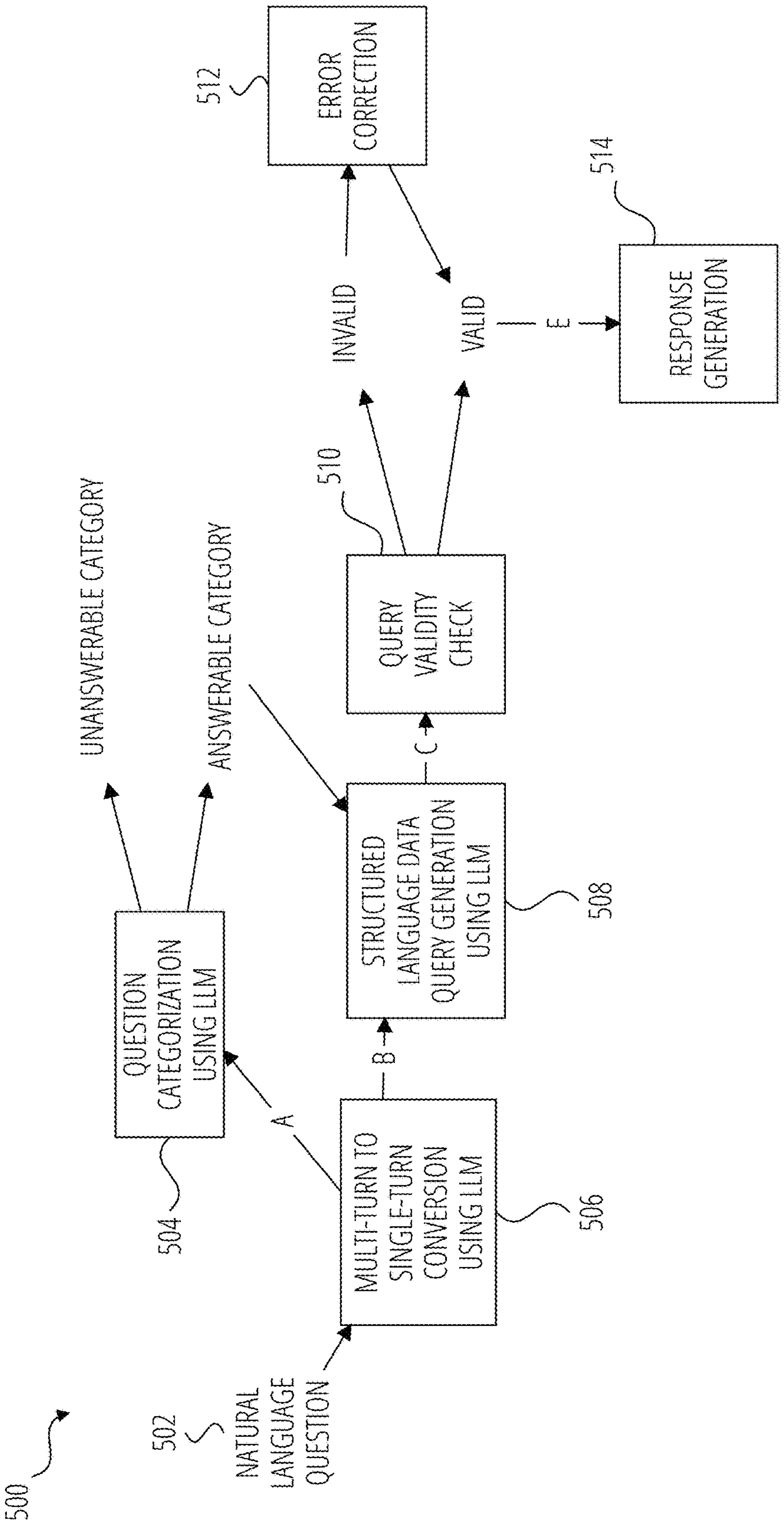
FIG. 5 is a flow diagram illustrating an example implementation of an example method, in accordance with some embodiments described herein.

FIG. 5 is a flow diagram illustrating an example implementation of method 400 of FIG. 4, in accordance with some embodiments described herein. A natural language question 502 is received from a user and determines whether natural language question 502 comprises a multi-turn (natural language) question or conversation (e.g., comprising multiple iterations of prior natural language questions and their corresponding generated answers within a current context history). If the natural language question 502 is determined to be a multi-turn question/conversation), a multi-turn to single-turn conversion using LLM 506 receives the natural language question 502 and converts the multi-turn question/conversation into a single-turn (natural language) question using an LLM (506). Where the natural language question 502 already comprises a single-turn question, no conversion is performed (e.g., 506 is skipped). At step A, a single-turn question (either from the natural language question 502 or from the multi-turn to single-turn conversion using LLM 506) is submitted to a question categorization using LLM 504, which generates an output that indicates a category for the single-turn question. The category can be an unanswerable category, or an answerable category. If the single-turn question is an answerable category, at step B, a structured language data query generation using LLM 508 receives the single-turn question to generate a structured language data query. At step C, a query validity check 510 is performed on the structured language data query to generate an output that indicates whether the structured language data query is valid or invalid. If the structured language data query is invalid, an error correction 512 can be performed on the structured language data query to generate a valid, error-corrected structured language data query. If the structured language data query is valid after the query validity check 510 or after the error correction 512, at step E, a response generation 514 generates a response based on the structured language data query (e.g., by performing the structured language data query on a data store, and generates the response based on a resulting query result).

For some example embodiments, during structured language data query generation using LLM 508, a feature extraction operation is performed. In particular, a feature extraction operation can comprise using an LLM to categorize the question (generated by multi-turn to single-turn conversion using LLM 506) across one or more types of data questions (e.g., question categories). For example, the types of data questions can include, without limitation: ratio question-mark as true if the question asks a calculation on percentage, or ratio (e.g., terms like margin, conversion rate are also often referred to a ratio calculation); time dimension aggregation—mark as true if the question involves aggregate upon the time dimension; period over period question—mark as true if the question asks about period-over-period calculation (e.g., Day-over-day (DoD), Week-over-week (WoW), Month-over-month (MoM), Year-over-year (YoY)); rolling metric question—mark as true if the question asks to calculate metrics on rolling time window (e.g., 3-day rolling average sales, 3-month rolling total revenue); and rank calculation-mark as true if the question asks about 'top k/highest/lowest' upon a given measure or explicitly asked to compute a rank of a measure in the question. According to various example embodiments, during structured language data query generation using LLM 508, a custom SQL generation prompt is constructed based on one or more types of data questions determined (e.g., selected or identified) for a question generated by multi-turn to single-turn conversion using LLM 506.

Figure 6:
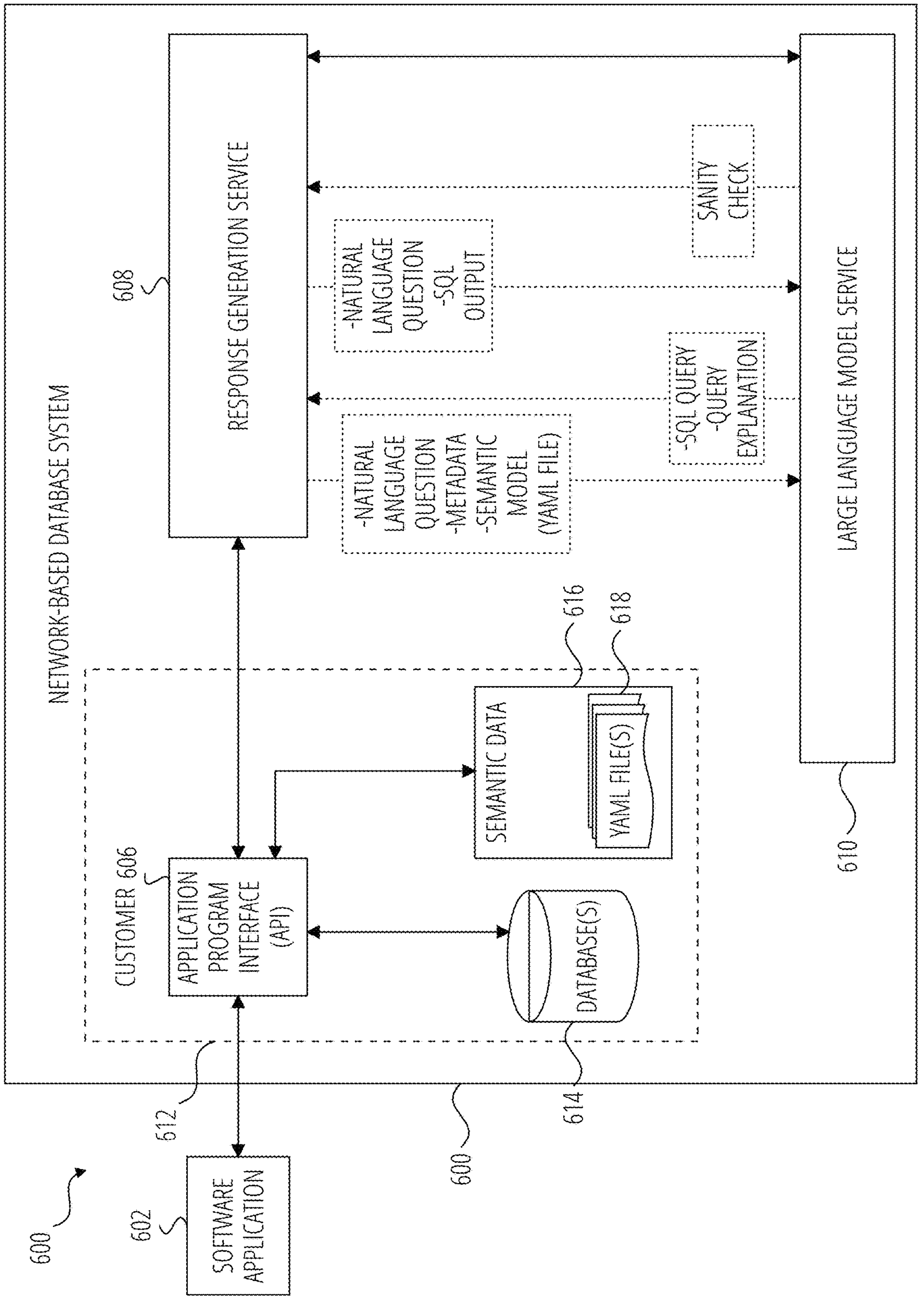
FIG. 6 is a block diagram illustrating an example network-based database system that implements a structured language data query generator, in accordance with some embodiments described herein.

FIG. 6 is a block diagram illustrating an example network-based database system 600 that implements the structured language data query generator 130, in accordance with some embodiments described herein. As shown, the network-based database system 600 comprises an application program interface (API) 606, a response generation service 608, a large language model service 610, semantic data 616 (e.g., which can comprise one or more YAML files 618), and one or more databases 614. For various example embodiments, the one or more databases 614 and the semantic data 616 are associated with a particular customer 612 (e.g., customer account). During operation, a software application 602 can interact with the network-based database system 600 through the application program interface (API) 606. The software application 602 can submit a request to answer a natural language question via the API 606. Based on the request, the API 606 can identify a YAML file (associated with a particular semantic model) from the semantic data 616, and can submit the natural language question and the identified YAML file to the response generation service 608 for processing. To process the natural language question and the identified YAML file, the response generation service 608 can submit the natural language question, metadata for the one or more databases 614, and the identified YAML file to a first set of large language models via the large language model service 610, which can serve as an interface for access one or more different types of large language models (LLMs). The large language model service 610 can return a SQL query and a query explanation, generated by the first set of large language models, to the response generation service 608. The response generation service 608 can cause the generated SQL query to be performed on the one or more databases 614, and the SQL query result (represented as SQL output) and the original natural language question can be submitted to a second set of large language models (via large language model service 610) for sanity check. The large language model service 610 can return a sanity check, generated by the second set of large language models, to the response generation service 608. If the sanity check indicates that the SQL output is responsive to the natural language question, the response generation service 608 can send a response, which can comprise SQL output and query explanation, back to the software application 602 (the sender of request) via the API 606.

Figure 7:
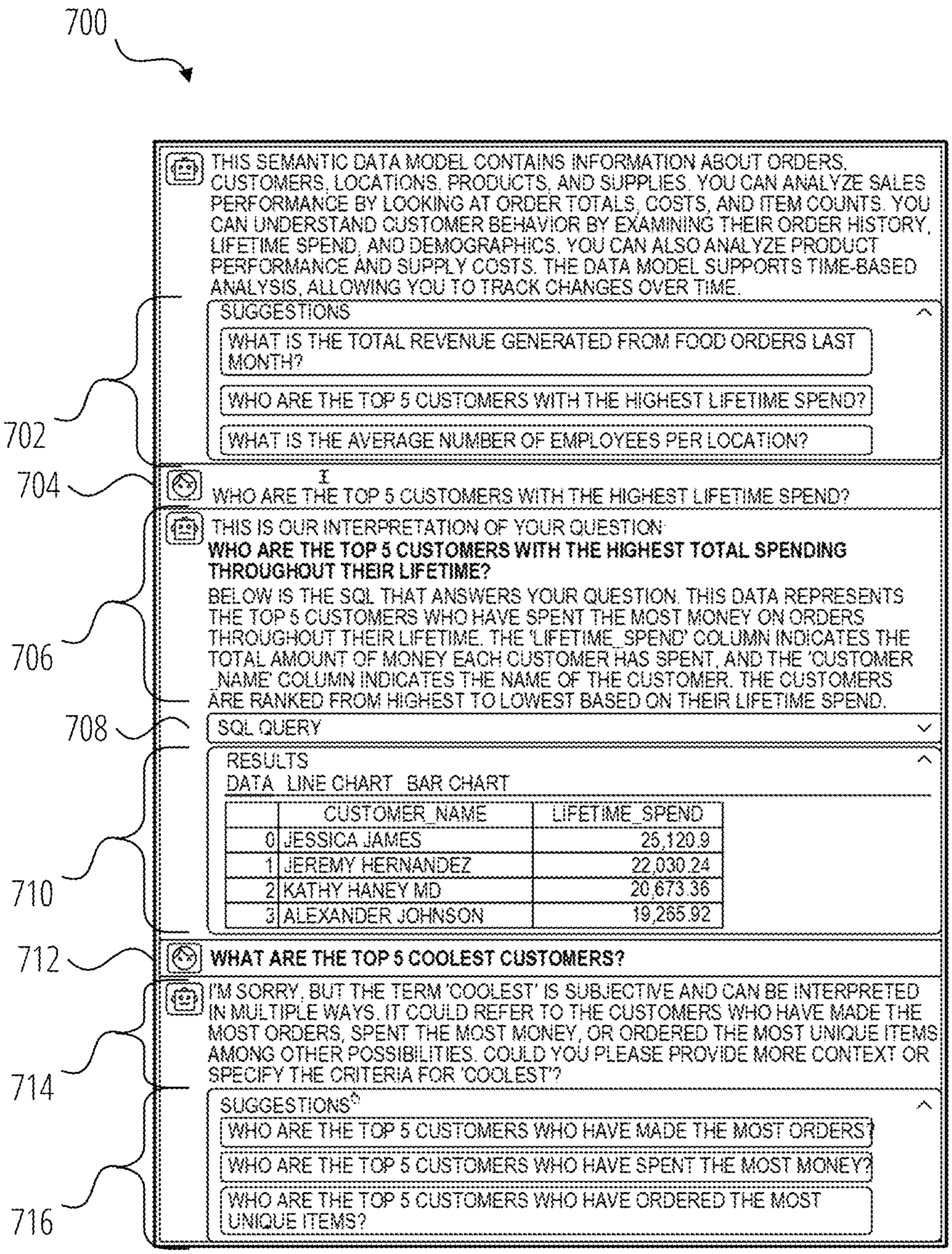
FIG. 7 illustrates an example chat graphical user interface that presents an example conversation generated by a structured language data query generator, in accordance with some embodiments described herein.

FIG. 7 illustrates an example chat graphical user interface 700 that presents an example conversation generated by a structured language data query generator, in accordance with some embodiments described herein. The chat graphical user interface 700 includes a number of natural language questions (e.g., 704, 712) that are submitted (via the chat graphical user interface 700) by a user for response, corresponding responses (e.g., 706, 714) to those natural language questions, and auto-generated question suggestions (e.g., 702, 716) from which the user can select to submit. As part of the response, the chat graphical user interface 700 includes a graphical user interface for reviewing a structured language data query (e.g., 708) generated by various example embodiments for a user-submitted natural language question (e.g., 706) and used by various example embodiments to generate a response (e.g., 710) for the user-submitted natural language question.

Figure 8:
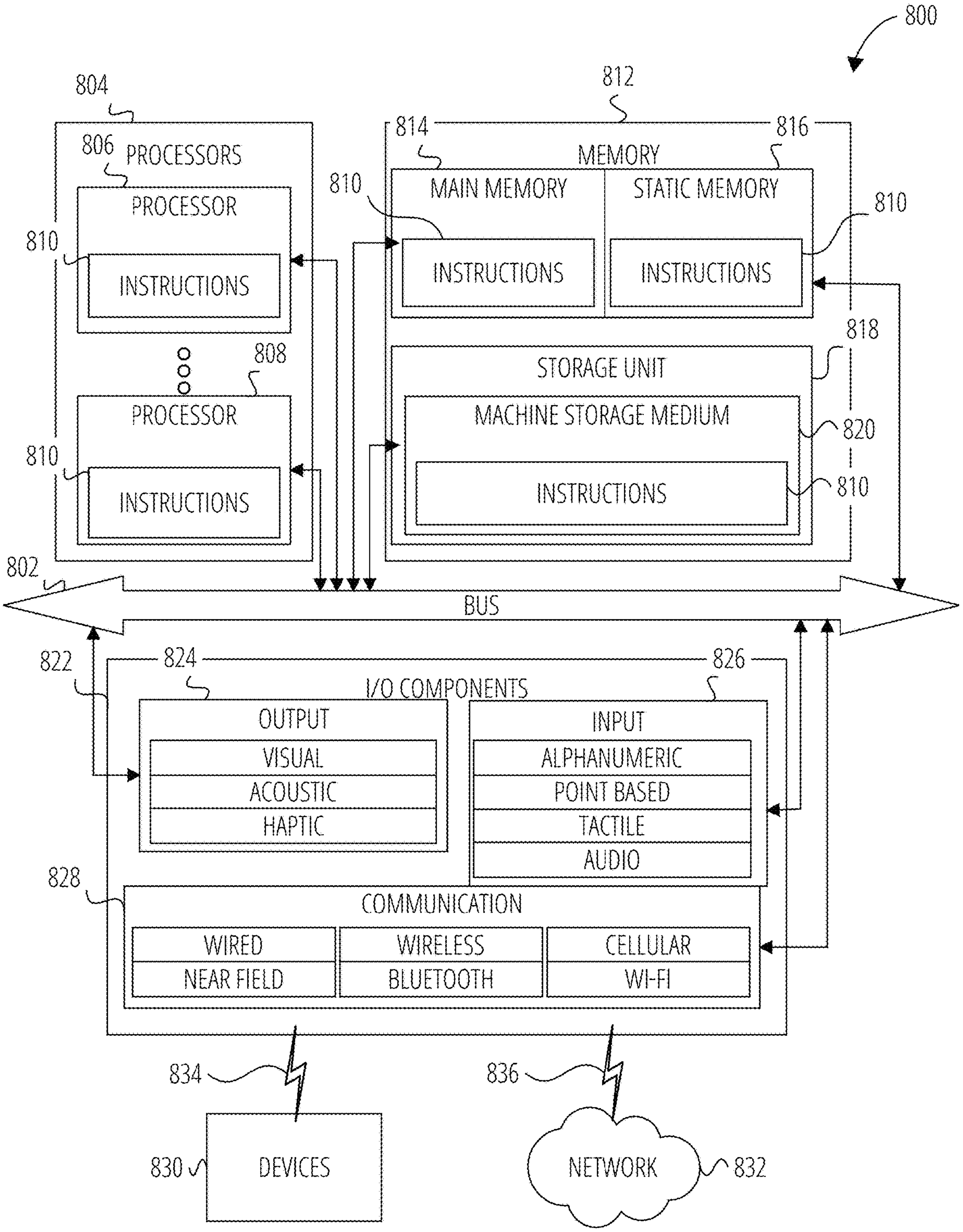
FIG. 8 illustrates a diagrammatic representation of a machine in the form of a computer system within which a set of instructions can be executed for causing the machine to perform any one or more of the methodologies discussed herein, according to some embodiments of the present disclosure.

FIG. 8 illustrates a diagrammatic representation of a machine 800 in the form of a computer system within which a set of instructions can be executed for causing the machine 800 to perform any one or more of the methodologies discussed herein, according to an example embodiment. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein can be executed. For example, the instructions 810 may cause the machine 800 to execute any one or more operations of any one or more of the methods described herein. As another example, the instructions 810 may cause the machine 800 to implement portions of the data flows described herein. In this way, the instructions 810 transform a general, non-programmed machine into a particular machine 800 (e.g., the compute service manager 106, the execution platform 108, client device 112) that is specially configured to carry out any one of the described and illustrated functions in the manner described herein.

In alternative embodiments, the machine 800 operates as a standalone device or can be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines machine 800 that individually or jointly execute the instructions 810 to perform any one or more of the methodologies discussed herein.

The machine 800 includes processors 804, memory 812, and input/output (I/O) components 822 configured to communicate with each other such as via a bus 802. In an example embodiment, the processors 804 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 806 and a processor 808 that may execute the instructions 810. The term "processor" is intended to include multi-core processors 804 that may comprise two or more independent processors (sometimes referred to as "cores") that may execute instructions 810 contemporaneously. Although FIG. 8 shows multiple processors 804, the machine 800 may include a single processor with a single core, a single processor with multiple cores (e.g., a multi-core processor), multiple processors with a single core, multiple processors with multiple cores, or any combination thereof.

The memory 812 may include a main memory 814, a static memory 816, and a storage unit 818, all accessible to the processors 804 such as via the bus 802. The main memory 814, the static memory 816, and the storage unit 818 comprising a machine storage medium 820 may store the instructions 810 embodying any one or more of the methodologies or functions described herein. The instructions 810 may also reside, completely or partially, within the main memory 814, within the static memory 816, within the storage unit 818, within at least one of the processors 804 (e.g., within the processor's cache memory), or any suitable combination thereof, during execution thereof by the machine 800.

The I/O components 822 include components to receive input, provide output, produce output, transmit information, exchange information, capture measurements, and so on. The specific I/O components 822 that are included in a particular machine 800 will depend on the type of machine. For example, portable machines such as mobile phones will likely include a touch input device or other such input mechanisms, while a headless server machine will likely not include such a touch input device. It will be appreciated that the I/O components 822 may include many other components that are not shown in FIG. 8. The I/O components 822 are grouped according to functionality merely for simplifying the following discussion and the grouping is in no way limiting. In various example embodiments, the I/O components 822 may include output components 824 and input components 826. The output components 824 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 822 may include communication components 828 operable to couple the machine 800 to a network 832 via a coupling 836 or to devices 830 via a coupling 834. For example, the communication components 828 may include a network interface component or another suitable device to interface with the network 832. In further examples, the communication components 828 may include wired communication components, wireless communication components, cellular communication components, and other communication components to provide communication via other modalities. The devices 830 can be another machine or any of a wide variety of peripheral devices (e.g., a peripheral device coupled via a universal serial bus (USB)). For example, as noted above, the machine 800 may correspond to any client device, the compute service manager 106, the execution platform 108, and the devices 830 may include any other of these systems and devices.

The various memories (e.g., 812, 814, 816, and/or memory of the processor(s) 804 and/or the storage unit 818) may store one or more sets of instructions 810 and data structures (e.g., software) embodying or utilized by any one or more of the methodologies or functions described herein. These instructions 810, when executed by the processor(s) 804, cause various operations to implement the disclosed embodiments.

As used herein, the terms "machine-storage medium," "device-storage medium," and "computer-storage medium" mean the same thing and can be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 832 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 832 or a portion of the network 832 may include a wireless or cellular network, and the coupling 836 can be a Code Division Multiple Access (CDMA) connection, a Global System for Mobile communications (GSM) connection, or another type of cellular or wireless coupling. In this example, the coupling 836 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 810 can be transmitted or received over the network 832 using a transmission medium via a network interface device (e.g., a network interface component included in the communication components 828) and utilizing any one of a number of well-known transfer protocols (e.g., hypertext transfer protocol (HTTP)). Similarly, the instructions 810 can be transmitted or received using a transmission medium via the coupling 834 (e.g., a peer-to-peer coupling) to the devices 830. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 810 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: receiving a request to answer a natural language question generated by a user; using a set of large language models to generate a structured language data query for a data store based on semantic data and the natural language question, the semantic data comprising a semantic description of at least a portion of a schema of the data store; and in response to the set of large language models successfully generating the structured language data query: determining whether the structured language data query is valid; and in response to determining that the structured language data query is valid: causing the structured language data query to be performed on the data store; receiving a query result from the data store responsive to the structured language data query; generating a response that comprises the query result, the response being responsive to request; and sending the response back to a sender of the request.

In Example 2, the subject matter of Example 1 includes, wherein the set of large language models is a first set of large language models, and wherein the operations comprise: prior to the sending of the response back to the sender, using a second set of large language models to generate an output based on the query result and the natural language question, the output indicating whether the query result is responsive to the natural language question, the sending of the response is performed in response to determining that the output indicates that the query result is responsive to the natural language question.

In Example 3, the subject matter of Examples 1-2 includes, wherein the using of the set of large language models to generate the structured language data query based on the semantic data and the natural language question comprises: using the set of large language models to generate the structured language data query and an explanation of the structured language data query based on semantic data and the natural language question, the response comprising at least a portion of the explanation.

In Example 4, the subject matter of Examples 1-3 includes, wherein the using of the set of large language models to generate the structured language data query based on the semantic data and the natural language question comprises: using a first large language model of the set of large language models to generate a first output based on the semantic data and the natural language question, the first output indicating a category for the natural language question; and in response to the category indicating that the natural language question is answerable using the schema and the data store, using a second large language model to generate a second output based on the semantic data and the natural language question, the second output comprising the structured language data query.

In Example 5, the subject matter of Example 4 includes, wherein the output is a first output, wherein the response is a first response, and wherein the using of the set of large language models to generate the structured language data query based on the semantic data and the natural language question comprises: in response to the category indicating that the natural language question is not answerable using the schema and the data store: generating a second response that comprises feedback, the feedback being provided in the first output generated by the first large language model; and sending the second response back to the sender of the request.

In Example 6, the subject matter of Examples 4-5 includes, wherein the using of the second large language model to generate the second output based on the semantic data and the natural language question comprises: using the second large language model to generate the second output based on the semantic data, the natural language question, and metadata for the data store.

In Example 7, the subject matter of Examples 1-6 includes, wherein the receiving of the natural language question comprises receiving a schema selection with the natural language question, and wherein the operations comprise: selecting the semantic data based on the schema selection received with the natural language question.

In Example 8, the subject matter of Examples 1-7 includes, wherein the operations comprise: receiving a selection of the schema, the schema being selected by the user; and selecting the semantic data based on the selection of the schema.

In Example 9, the subject matter of Examples 1-8 includes, wherein the structure language data query comprises a structure query language (SQL) query.

In Example 10, the subject matter of Examples 1-9 includes, wherein the data store comprises a database.

In Example 11, the subject matter of Examples 1-10 includes, wherein the set of large language models is a first set of large language models, and wherein the determining of whether the structured language data query is valid comprises: using a second set of large language models to generate an output based on the natural language question and the structured language data query, the output indicating a validity of the structured language data query.

In Example 12, the subject matter of Examples 1-11 includes, wherein the request is received as input to an application program interface (API), and wherein the sending of the response back to a sender of the request comprises: returning the response as output of the API.

In Example 13, the subject matter of Examples 1-12 includes, wherein the semantic data is stored in a YAML file.

In Example 14, the subject matter of Examples 1-13 includes, wherein the semantic data comprises a semantic model that provides the semantic description, and wherein the semantic model comprises a structured representation of the data store.

In Example 15, the subject matter of Example 14 includes, wherein the semantic model is defined by one or more logical tables, wherein an individual logical table of the one or more logical tables semantically describes a data store table of the data store or a data store view of the data store, wherein the individual logical table comprises one or more logical columns, and wherein an individual logical column of the individual logical table semantically describes an underlying column of the data store table or the data store view.

In Example 16, the subject matter of Example 15 includes, wherein the individual logical column is either a non-time dimension logical column capable of storing a categorical value, a time dimension logical column capable of storing a time value, or a measure logical column capable of storing a numerical value.

In Example 17, the subject matter of Examples 14-16 includes, wherein the semantic model is defined by one or more logical tables, wherein an individual logical table of the one or more logical tables semantically describes a data store table of the data store or a data store view of the data store, wherein the individual logical table comprises one or more logical columns, and wherein an individual logical column of the individual logical table comprises an expression that references one or more underlying columns of the data store table or the data store view and that defines a derived column.

In Example 18, the subject matter of Examples 1-17 includes, wherein the request is a first request, wherein the user is a first user, and wherein the operations comprise: after sending the response to the sender, receiving a second request from the user to escalate the response to a second user for validation; in response to the second request, escalating the response for validation by the second user; and after the validation by the second user has been performed, designating the response as a validated response based on a validation result from the validation.

In Example 19, the subject matter of Examples 1-18 includes, wherein the operations comprise: prior to sending the response to the sender, comparing the response against one or more prior responses to validate the response; and in response to determining that the response is valid, designating the response as a validated response.

Example 20 is a method to implement any of Examples 1-19.

Example 21 is a machine-storage medium storing instructions that when executed by a machine, cause the machine to perform operations to implement any of Examples 1-19.

Example 22 is a system comprising: at least one hardware processor; and at least one memory storing instructions that cause the at least one hardware processor to perform operations comprising: receiving a multi-turn conversation that comprises: at least one prior natural language question and corresponding answer; and a recent natural language question; converting the multi-turn conversation into a single-turn natural language question using a large language model; using a set of large language models to generate a structured language data query for a data store based on semantic data and the single-turn natural language question, the semantic data comprising a semantic description of at least a portion of a schema of the data store; and in response the set of large language models successfully generating the structured language data query: determining whether the structured language data query is valid; and in response to determining that the structured language data query is valid: causing the structured language data query to be performed on the data store; receiving a query result from the data store responsive to the structured language data query; generating a response that comprises the query result, the response being responsive to request; and sending the response back to a sender of the request.

Example 23 is a method to implement Example 22.

Example 24 is a machine-storage medium storing instructions that when executed by a machine, cause the machine to perform operations to implement Example 22.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term “invention” merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent, to those of skill in the art, upon reviewing the above description.

In this document, the terms “a” or “an” are used, as is common in patent documents, to include one or more than one, independent of any other instances or usages of “at least one” or “one or more.” In this document, the term “or” is used to refer to a nonexclusive or, such that “A or B” includes “A but not B,” “B but not A,” and “A and B,” unless otherwise indicated. In the appended claims, the terms “including” and “in which” are used as the plain-English equivalents of the respective terms “comprising” and “wherein.” Also, in the following claims, the terms “including” and “comprising” are open-ended; that is, a system, device, article, or process that includes elements in addition to those listed after such a term in a claim is still deemed to fall within the scope of that claim.

What is claimed is:

1. A system comprising:

at least one hardware processor; and at least one memory storing instructions that cause the at least one hardware processor to perform operations comprising:

receiving a request to answer a natural language question generated by a user;

using a set of large language models to generate a structured language data query for a data store based on semantic data and the natural language question, the semantic data comprising a semantic model that provides a semantic description of at least a portion of a schema of the data store, the semantic model comprising a structured representation of the data store, the semantic model being defined by one or more logical tables, an individual logical table of the one or more logical tables semantically describing a data store table of the data store or a data store view of the data store, the individual logical table comprising one or more logical columns, and an individual logical column of the individual logical table semantically describing an underlying column of the data store table or the data store view; and in response to the set of large language models successfully generating the structured language data query:

determining whether the structured language data query is valid; and in response to determining that the structured language data query is valid:

causing the structured language data query to be performed on the data store;

receiving a query result from the data store responsive to the structured language data query;

generating a response that comprises the query result, the response being responsive to request; and sending the response back to a sender of the request.

2. The system of claim 1, wherein the set of large language models is a first set of large language models, and wherein the operations comprise:

prior to the sending of the response back to the sender, using a second set of large language models to generate an output based on the query result and the natural language question, the output indicating whether the query result is responsive to the natural language question, the sending of the response is performed in response to determining that the output indicates that the query result is responsive to the natural language question.

3. The system of claim 1, wherein the using of the set of large language models to generate the structured language data query based on the semantic data and the natural language question comprises:

using the set of large language models to generate the structured language data query and an explanation of the structured language data query based on semantic data and the natural language question, the response comprising at least a portion of the explanation.

4. The system of claim 1, wherein the using of the set of large language models to generate the structured language data query based on the semantic data and the natural language question comprises:

using a first large language model of the set of large language models to generate a first output based on the semantic data and the natural language question, the first output indicating a category for the natural language question; and in response to the category indicating that the natural language question is answerable using the schema and the data store, using a second large language model to generate a second output based on the semantic data and the natural language question, the second output comprising the structured language data query.

5. The system of claim 4, wherein the output is a first output, wherein the response is a first response, and wherein the using of the set of large language models to generate the structured language data query based on the semantic data and the natural language question comprises:

in response to the category indicating that the natural language question is not answerable using the schema and the data store:

generating a second response that comprises feedback, the feedback being provided in the first output generated by the first large language model; and sending the second response back to the sender of the request.

6. The system of claim 4, wherein the using of the second large language model to generate the second output based on the semantic data and the natural language question comprises:

using the second large language model to generate the second output based on the semantic data, the natural language question, and metadata for the data store.

7. The system of claim 1, wherein the receiving of the natural language question comprises receiving a schema selection with the natural language question, and wherein the operations comprise:

selecting the semantic data based on the schema selection received with the natural language question.

8. The system of claim 1, wherein the operations comprise:

receiving a selection of the schema, the schema being selected by the user; and selecting the semantic data based on the selection of the schema.

9. The system of claim 1, wherein the structure language data query comprises a structure query language (SQL) query.

10. The system of claim 1, wherein the data store comprises a database.

11. The system of claim 1, wherein the set of large language models is a first set of large language models, and wherein the determining of whether the structured language data query is valid comprises:

using a second set of large language models to generate an output based on the natural language question and the structured language data query, the output indicating a validity of the structured language data query.

12. The system of claim 1, wherein the request is received as input to an application program interface (API), and wherein the sending of the response back to a sender of the request comprises:

returning the response as output of the API.

13. The system of claim 1, wherein the individual logical column is either a non-time dimension logical column capable of storing a categorical value, a time dimension logical column capable of storing a time value, or a measure logical column capable of storing a numerical value.

14. The system of claim 1, wherein the individual logical column of the individual logical table comprises an expression that references one or more underlying columns of the data store table or the data store view and that defines a derived column.

15. The system of claim 1, wherein the request is a first request, wherein the user is a first user, and wherein the operations comprise:

after sending the response to the sender, receiving a second request from the user to escalate the response to a second user for validation;

in response to the second request, escalating the response for validation by the second user; and after the validation by the second user has been performed, designating the response as a validated response based on a validation result from the validation.

16. The system of claim 1, wherein the operations comprise:

prior to sending the response to the sender, comparing the response against one or more prior responses to validate the response; and in response to determining that the response is valid, designating the response as a validated response.

17. A method comprising:

receiving, by a hardware processor, a request to answer a natural language question generated by a user;

using, by the hardware processor, a set of large language models to generate a structured language data query for a data store based on semantic data and the natural language question, the semantic data comprising a semantic model that provides a semantic description of at least a portion of a schema of the data store, the semantic model comprising a structured representation of the data store, the semantic model being defined by one or more logical tables, an individual logical table of the one or more logical tables semantically describing a data store table of the data store or a data store view of the data store, the individual logical table comprising one or more logical columns, and an individual logical column of the individual logical table semantically describing an underlying column of the data store table or the data store view; and in response the set of large language models successfully generating the structured language data query:

determining, by the hardware processor, whether the structured language data query is valid; and in response to determining that the structured language data query is valid:

causing, by the hardware processor, the structured language data query to be performed on the data store;

receiving, by the hardware processor, a query result from the data store responsive to the structured language data query;

generating, by the hardware processor, a response that comprises the query result, the response being responsive to request; and sending, by the hardware processor, the response back to a sender of the request.

18. The method of claim 17, wherein the individual logical column of the individual logical table comprises an expression that references one or more underlying columns of the data store table or the data store view and that defines a derived column.

19. A machine-readable storage medium, the machine-readable storage medium including instructions that when executed by a machine, cause the machine to perform operations comprising:

receiving a multi-turn conversation that comprises:

at least one prior natural language question and corresponding answer; and a recent natural language question;

converting the multi-turn conversation into a single-turn natural language question using a large language model;

using a set of large language models to generate a structured language data query for a data store based on semantic data and the single-turn natural language question, the semantic data comprising a semantic model that provides a semantic description of at least a portion of a schema of the data store, the semantic model comprising a structured representation of the data store, the semantic model being defined by one or more logical tables, an individual logical table of the one or more logical tables semantically describing a data store table of the data store or a data store view of the data store, the individual logical table comprising one or more logical columns, and an individual logical column of the individual logical table semantically describing an underlying column of the data store table or the data store view; and in response the set of large language models successfully generating the structured language data query:

determining whether the structured language data query is valid; and in response to determining that the structured language data query is valid:

causing the structured language data query to be performed on the data store;

receiving a query result from the data store responsive to the structured language data query;

generating a response that comprises the query result, the response being responsive to request; and sending the response back to a sender of the request.

20. The machine-readable storage medium of claim 19, wherein the individual logical column of the individual logical table comprises an expression that references one or more underlying columns of the data store table or the data store view and that defines a derived column.

* * * * *